United States Patent
Lin

(10) Patent No.: US 10,750,055 B2
(45) Date of Patent: Aug. 18, 2020

(54) IMAGE PROCESSING APPARATUS WITH COLOR CONVERSION FOR REDUCED CONSUMPTION OF COLOR MATERIALS, IMAGE PROCESSING METHOD, AND STORAGE MEDIUM

(71) Applicant: CANON KABUSHIKI KAISHA, Tokyo (JP)

(72) Inventor: Juanxi Lin, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/703,261

(22) Filed: Sep. 13, 2017

(65) Prior Publication Data
US 2018/0101338 A1    Apr. 12, 2018

(30) Foreign Application Priority Data

Oct. 7, 2016   (JP) ................................. 2016-199177
Mar. 7, 2017   (JP) ................................. 2017-042890

(51) Int. Cl.
| | |
|---|---|
| H04N 1/60 | (2006.01) |
| G06F 3/12 | (2006.01) |
| G03G 15/00 | (2006.01) |
| G03G 15/01 | (2006.01) |
| G06K 15/02 | (2006.01) |

(52) U.S. Cl.
CPC ....... H04N 1/6025 (2013.01); G03G 15/0126 (2013.01); G03G 15/5087 (2013.01); G03G 15/556 (2013.01); G06F 3/1218 (2013.01); G06F 3/1284 (2013.01); G06K 15/02 (2013.01);
(Continued)

(58) Field of Classification Search
CPC combination set(s) only.
See application file for complete search history.

(56) References Cited

U.S. PATENT DOCUMENTS 6,480,299 B1 * 11/2002 Drakopoulos ....... H04N 1/6033
                                                   358/1.1
7,196,823 B2 *  3/2007 Hagai .................. H04N 1/6025
                                                   345/601
(Continued)

FOREIGN PATENT DOCUMENTS

JP          2014-127781           7/2014

Primary Examiner — Barbara D Reinier
(74) Attorney, Agent, or Firm — Venable LLP

(57) ABSTRACT

An object of the present invention is to provide an image processing apparatus capable of reducing color material consumption to the maximum while maintaining the hue of an image before and after color conversion to reduce the color material consumption. The present invention is an image processing apparatus having a first lookup table to convert pixel values in a color space into pixel values of color materials, the apparatus including: an acceptable color difference derivation unit configured to derive an acceptable color difference indicating a size of a range of acceptable color difference, which corresponds to each grid point in the color space; a pixel value determination unit configured to determine pixel values of color materials, which corresponds to each of the grid points, based on the derived acceptable color difference; and a lookup table creation unit configured to create a second lookup table to convert pixel values in the color space into the determined pixel values of color materials.

22 Claims, 20 Drawing Sheets

(52) U.S. Cl.
CPC ......... *H04N 1/6019* (2013.01); *H04N 1/6075* (2013.01)

(56) References Cited

U.S. PATENT DOCUMENTS

| | | | |
|---|---|---|---|
| 7,304,766 B2* | 12/2007 | Zeng | H04N 1/6025 345/601 |
| 10,091,398 B2* | 10/2018 | Morikawa | G06F 3/1219 |
| 10,412,270 B2* | 9/2019 | Yamamoto | H04N 1/6019 |

* cited by examiner

GRID POINT OF INTEREST ( GRID POINT 1901 )

PERIPHERAL GRID POINTS ( GRID POINTS 1902 TO 1927 )

IMAGE PROCESSING APPARATUS WITH COLOR CONVERSION FOR REDUCED CONSUMPTION OF COLOR MATERIALS, IMAGE PROCESSING METHOD, AND STORAGE MEDIUM

BACKGROUND OF THE INVENTION

Field of the Invention

The present invention relates to a printing technique and in detail, relates to a technique to reduce toner consumption while maintaining a hue.

Description of the Related Art

In recent years, in an office environment, the running cost of a printer is emphasized and a printer is provided, which has a function to operate while suppressing consumption of color materials, such as toner, and power. Among such printers, there exists a printer that operates in a mode to reduce toner consumption, that is, a so-called toner-saving mode. In the toner-saving mode, toner consumption is reduced by adjusting (reducing) each value of C (cyan), M (magenta), Y (yellow), and K (black) by using a one-dimensional gamma table.

On the other hand, as a color printer prevails, a demand for image quality is increasing and in recent years, even in the case where printing is performed in the toner-saving mode, the same image quality as that in the case of printing in the normal mode is demanded. In the conventional toner-saving mode, toner consumption is reduced by uniformly reducing each value of CMYK to control the toner amount of each output color, but the image contents are not taken into consideration, and therefore, there is such a problem that a color difference before and after adjustment becomes large depending on color, and therefore, it is not possible to maintain the hue of an image.

In order to solve the problem such as this, Japanese Patent Laid-Open No. 2014-127781 has disclosed a technique to convert each value of the original CMYK into each value of CMYK that minimizes toner consumption within a range of a predetermined color space, in which a color difference becomes less than or equal to a predetermined value, based on the lightness, saturation, and hue adjusted by a user.

SUMMARY OF THE INVENTION

However, in Japanese Patent Laid-Open No. 2014-127781, color adjustment is performed for all colors within a range of color difference of the same size and that the magnitude of color difference that can maintain a hue differs depending on color is not taken into consideration. Because of this, there is such a problem that, for part of colors, it is not possible to maintain a hue because the range of color difference in which color adjustment is performed is too large and on the other hand, for part of colors, it is not possible to reduce toner consumption to the maximum because the range of color difference in which color adjustment is performed is too small.

Consequently, an object of the present invention is, in view of the above-described problem, to provide an image processing apparatus capable of reducing consumption of color materials, such as toner, to the maximum while maintaining the hue of an image before and after color conversion to reduce the consumption.

The present invention is an image processing apparatus having a first lookup table to convert pixel values in a color space into pixel values of color materials, the apparatus including: an acceptable color difference derivation unit configured to derive an acceptable color difference indicating a size of a range of acceptable color difference, which corresponds to each grid point in the color space; a pixel value determination unit configured to determine pixel values of color materials, which corresponds to each of the grid points, based on the derived acceptable color difference; and a lookup table creation unit configured to create a second lookup table to convert pixel values in the color space into the determined pixel values of color materials.

Further features of the present invention will become apparent from the following description of exemplary embodiments with reference to the attached drawings.

DESCRIPTION OF THE EMBODIMENTS

In the following, with reference to the attached drawings, preferred embodiments of the present invention are explained in detail. The following embodiments are not intended to limit the present invention according to the scope of the claims and all the features explained below are not necessarily indispensable as the solution of the present invention.

First Embodiment

<About Configuration of Image Forming Apparatus>

Figure 1A:
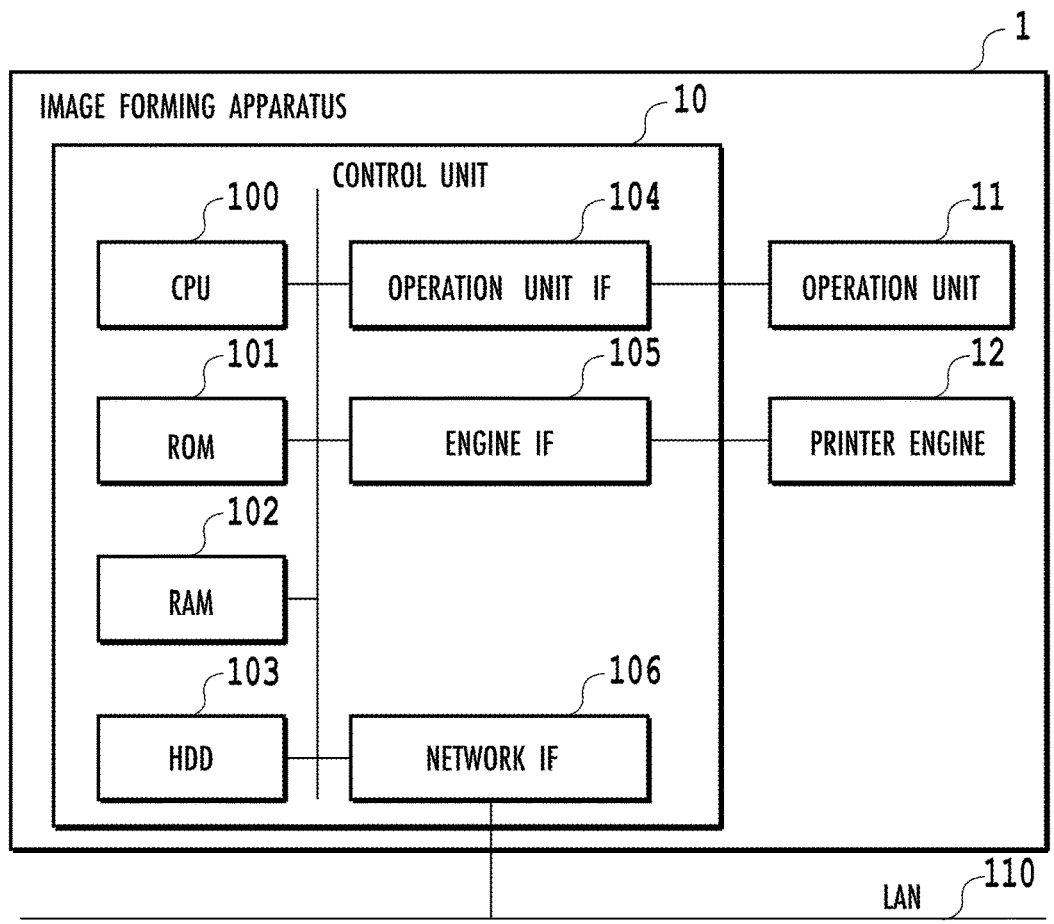
FIG. 1A and FIG. 1B are diagrams showing an outline configuration of an image forming apparatus 1 in a first embodiment.

FIG. 1A is a block diagram showing a hardware configuration of the image forming apparatus 1 in the present embodiment. The image forming apparatus 1 includes a control unit 10, an operation unit 11, and a printer engine 12.

The control unit 10 having a CPU 100 controls the operation of the entire image forming apparatus 1. The CPU 100 loads programs stored in at least one of a ROM 101 and a hard disk drive (hereinafter, HDD) 103 onto a RAM 102 and executes the loaded programs. Due to this, functions in the present embodiment, to be described later, are implemented and at the same time, processing in the present embodiment, to be described later, is performed. The RAM 102 that temporarily stores data is the main memory of the CPU 100 and provides a work area. The HDD 103 stores image data, various programs, and so on. An operation unit interface (hereinafter, "interface" is described as "IF") 104 connects the control unit 10 and the operation unit 11. The operation unit 11 receives an input from a user and presents information to a user. Specifically, the operation unit 11 includes a liquid crystal display unit having a touch panel function, a keyboard, and so on. An engine IF 105 connects the control unit 10 and the printer engine 12. Image data is output from the control unit 10 via the engine IF 105 and the printer engine 12 forms an image on a printing medium, such as paper, based on the output image data. A network IF 106 connects the image forming apparatus 1 to a LAN 110. The image forming apparatus 1 transmits data to an information processing apparatus (hereinafter, PC) connected to the LAN 110 and receives data from the PC via the network IF 106.

The image forming apparatus in the present embodiment is not limited to a dedicated apparatus specialized in the printing function, but includes a multi function printer that combines the printing function and other functions, a production apparatus that forms an image and a pattern on a printing medium, and so on.

Figure 1B:
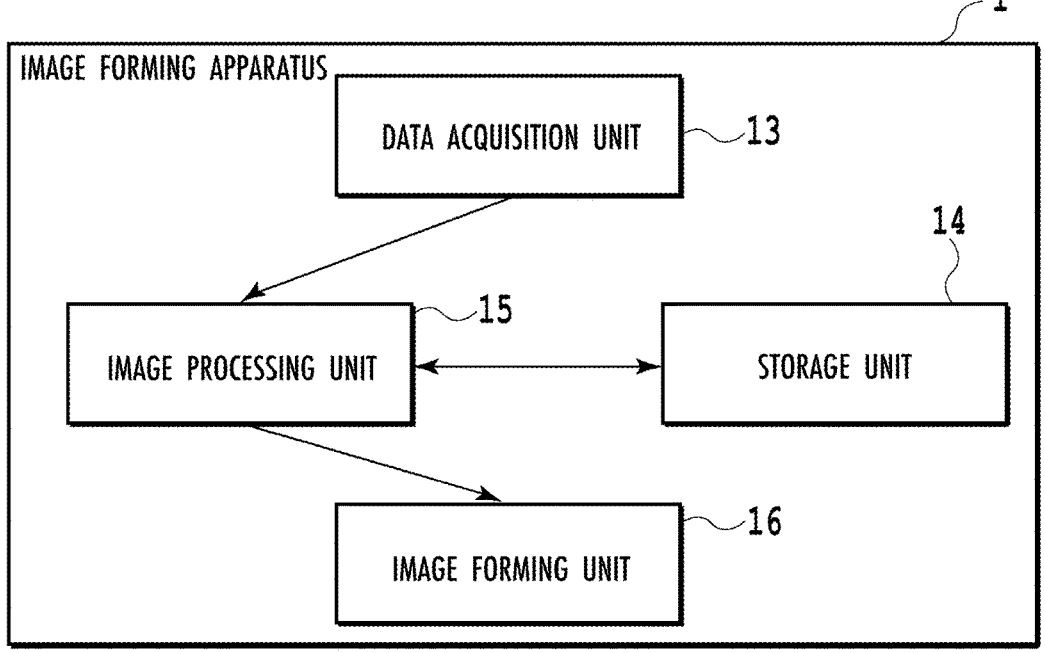

FIG. 1B is a diagram showing a function configuration of the image forming apparatus 1 in the present embodiment. The image forming apparatus 1 includes a data acquisition unit 13, a storage unit 14, an image processing unit 15, and an image forming unit 16.

The data acquisition unit 13 acquires data or the like that is transmitted from the PC connected to the image forming apparatus 1 and which is input to the image forming apparatus 1, and outputs the acquired data to the image processing unit 15. This data is, for example, image data (hereinafter, RGB image data) in the bitmap format in which each pixel has pixel values of R (red), G (green), and B (blue), a drawing command, and so on.

The storage unit 14 is implemented by the ROM 101, the RAM 102, the HDD 103, and so on. In the storage unit 14, an original LUT (Table 1) for color conversion to convert each value of R, G, and B (hereinafter, these values are called RGB values) indicating a grid point in the RGB space into each value of C, M, Y, and K (hereinafter, also called CMYK values) is stored. The original LUT is an LUT that is used in color conversion at the time of printing in the normal mode, not the toner-saving mode. Further, in the storage unit 14, a table that holds each value of L*, a*, and b* (hereinafter, also called L*a*b* values), which corresponds to a CMYK value of the original LUT, a table that holds L*a*b* values corresponding to an important color, a table that holds an acceptable color difference corresponding to an important color, and so on are also stored. Here, the important color is a color that requires adjustment in particular at the time of implementing high-quality color reproduction and includes, for example, a skin color, a color of the sea (blue), a color of lawn (green), and so on. Further, the acceptable color difference indicates the size of a range of acceptable color difference and in detail, the acceptable color difference is a color difference between an arbitrary first color and an arbitrary second color in the case where the first color is converted into the second color, and is the maximum value of color difference that can maintain the hue of the first color. In the L*a*b* space, a color difference between two colors is calculated by expression (1).

$$\Delta E = \sqrt{(L*(1) - L*(2))^2 + (a*(1) - a*(2))^2 + (b*(1) - b*(2))^2} \quad \text{expression (1)}$$

In expression (1), L* (1) is the L* value of the first color, a*(1) is the a* value of the first color, and b*(1) is the b* value of the first color, and L* (2) is the L* value of the second color, a* (2) is the a* value of the second color, and b* (2) is the b* value of the second color.

In Table 1 below, an example of the original LUT is shown. As shown in Table 1, the original LUT holds CMYK values corresponding to grid points distributed at equal intervals in the RGB space. In the present embodiment, the total number of grid points in the RGB space is represented by P.

TABLE 1

| Grid point | RGB values | CMYK values |
|---|---|---|
| grid point 1 | R (1), G (1), B (1) | C (1), M (1), Y (1), K (1) |
| grid point 2 | R (2), G (2), B (2) | C (2), M (2), Y (2), K (2) |
| ... | ... | ... |
| grid point P | R (P), G (P), B (P) | C (P), M (P), Y (P), K (P) |

The image processing unit 15 derives the acceptable color differences corresponding to all the grid points in the RGB space and derives new CMYK values based on the derived acceptable color differences. Next, the image processing unit 15 creates an LUT (hereinafter, updated LUT) that is used in the toner-saving mode by updating the CMYK values of the original LUT by using the derived new CMYK values. Next, the image processing unit 15 converts RGB image data into CMYK image data by converting the RGB values of each pixel of the RGB image data output from the data acquisition unit 13 into CMYK values based on the updated LUT. Here, the CMYK image data is image data in the bitmap format, in which each pixel has CMYK values. Next, the image processing unit 15 outputs the CMYK image data to the image forming unit 16. Details of the image processing unit 15 will be described later by using FIG. 2.

The image forming unit 16 forms an image on a printing medium by using toner of each of CMYK based on the CMYK image data output from the image processing unit 15.

In the present embodiment, the case is explained where the image forming apparatus 1 includes all the components shown in FIG. 1B, but the configuration may be one in which an image processing apparatus separate from the image forming apparatus includes part or all of the components.

<About Image Processing Unit>

Figure 2:
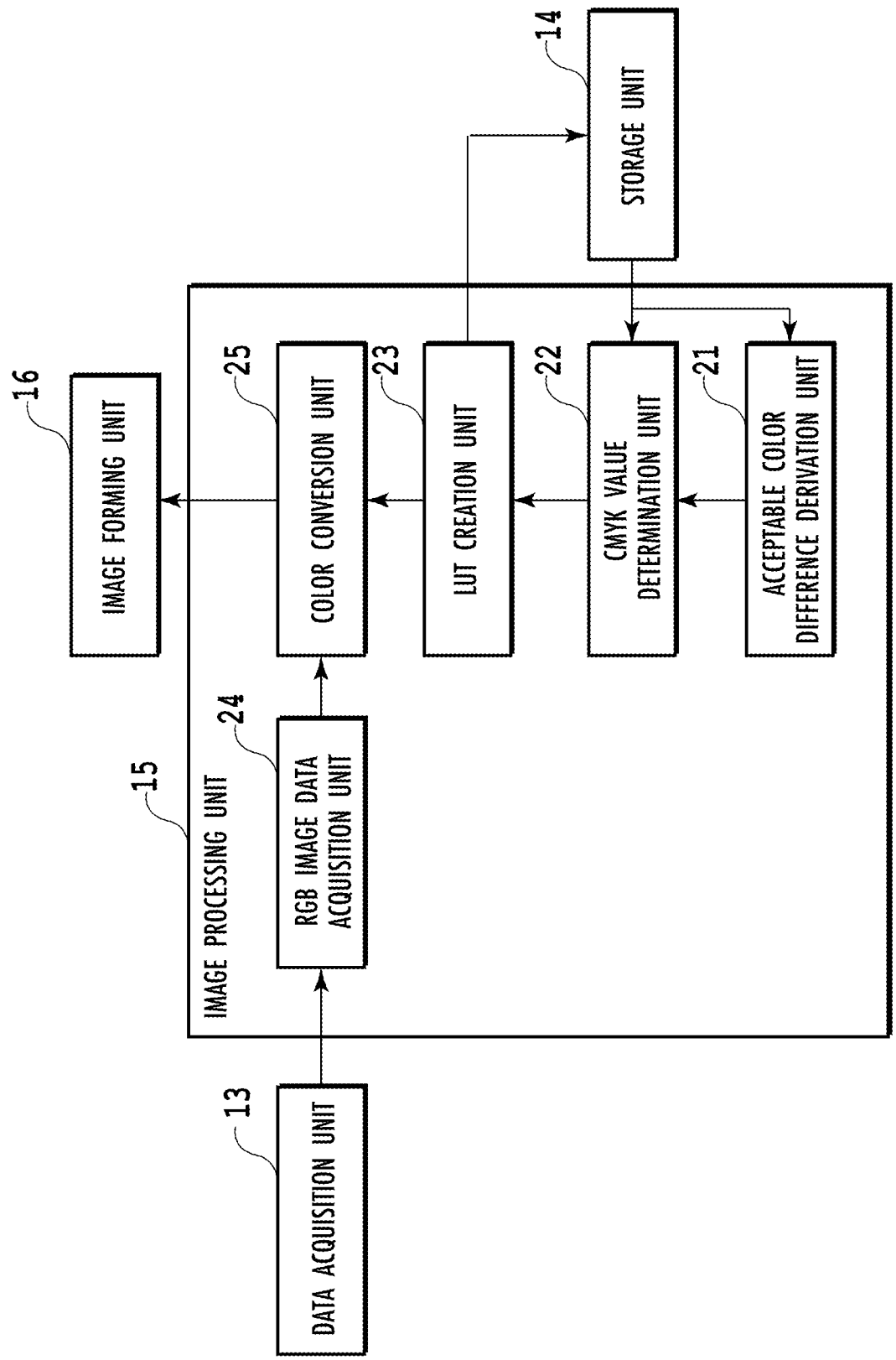
FIG. 2 is a diagram for explaining an image processing unit 15 in the first embodiment.

In the following, the image processing unit 15 in the present embodiment is explained by using FIG. 2. An acceptable color difference derivation unit 21 acquires the L*a*b* values corresponding to the important color from the storage unit 14 and the acceptable color difference corresponding to the important color. Then, the acceptable color difference derivation unit 21 calculates the acceptable color difference corresponding to each grid point in the RGB space based on these acquired values and creates a table that holds the acceptable color difference corresponding to each grid point in the RGB space. An example of this table is shown in Table 2. In Table 2, the acceptable color difference corresponding to the jth grid point is represented as $\Delta E_{grid\ point\ j}$.

TABLE 2

| Grid point | Acceptable color difference |
|---|---|
| grid point 1 | $\Delta E_{grid\ point\ 1}$ |
| grid point 2 | $\Delta E_{grid\ point\ 2}$ |
| ... | ... |
| grid point P | $\Delta E_{grid\ point\ P}$ |

The CMYK value determination unit 22 acquires the L*a*b* values corresponding to the CMYK values of the original LUT from the storage unit 14 and the acceptable color difference held in the table (Table 2) created by the acceptable color difference derivation unit 21. Then, the CMYK value determination unit 22 determines new CMYK values (each is represented as $C_{new}$, $M_{new}$, $Y_{new}$, $K_{new}$) based on these values. As described above, the CMYK value determination unit 22 functions as a pixel value determination unit configured to determine a new pixel value. Details of the CMYK value determination unit 22 will be described later by using FIG. 6.

The LUT creation (lookup table creation) unit 23 updates the CMYK values of the original LUT by using the CMYK values determined by the CMYK value determination unit 22 and creates an updated LUT. An example of the updated LUT created by the LUT creation unit 23 is shown in Table 3.

TABLE 3

| Grid point | RGB values | CMYK values (after updating) |
|---|---|---|
| grid point 1 | R (1), G (1), B (1) | $C_{new}$ (1), $M_{new}$ (1), $Y_{new}$ (1), $K_{new}$ (1) |
| grid point 2 | R (2), G (2), B (2) | $C_{new}$ (2), $M_{new}$ (2), $Y_{new}$ (2), $K_{new}$ (2) |
| ... | ... | ... |
| gridpoint P | R (P), G (P), B (P) | $C_{new}$ (P), $M_{new}$ (P), $Y_{new}$ (P), $K_{new}$ (P) |

An RGB image data acquisition unit 24 acquires the RGB image data output from the data acquisition unit 13 and outputs the RGB image data to a color conversion unit 25.

The color conversion unit 25 creates CMYK image data by converting the RGB values of each pixel of the RGB image data into CMYK values by using the updated LUT, which is created by the LUT creation unit 23, and outputs the created CMYK image data to the image forming unit 16.

<About Acceptable Color Difference Derivation Unit>

In the following, the acceptable color difference derivation unit 21 is explained. The acceptable color difference derivation unit 21 in the present embodiment creates a table that holds the acceptable color difference corresponding to the grid point by two steps below, which are obtained by roughly dividing the procedure into two.

First step: create a regression model capable of calculating the acceptable color difference across the entire color area.

Second step: create a table that holds the acceptable color difference corresponding to each grid point by calculating the acceptable color difference corresponding to each grid point by using the regression model created at First step.

Figure 3:
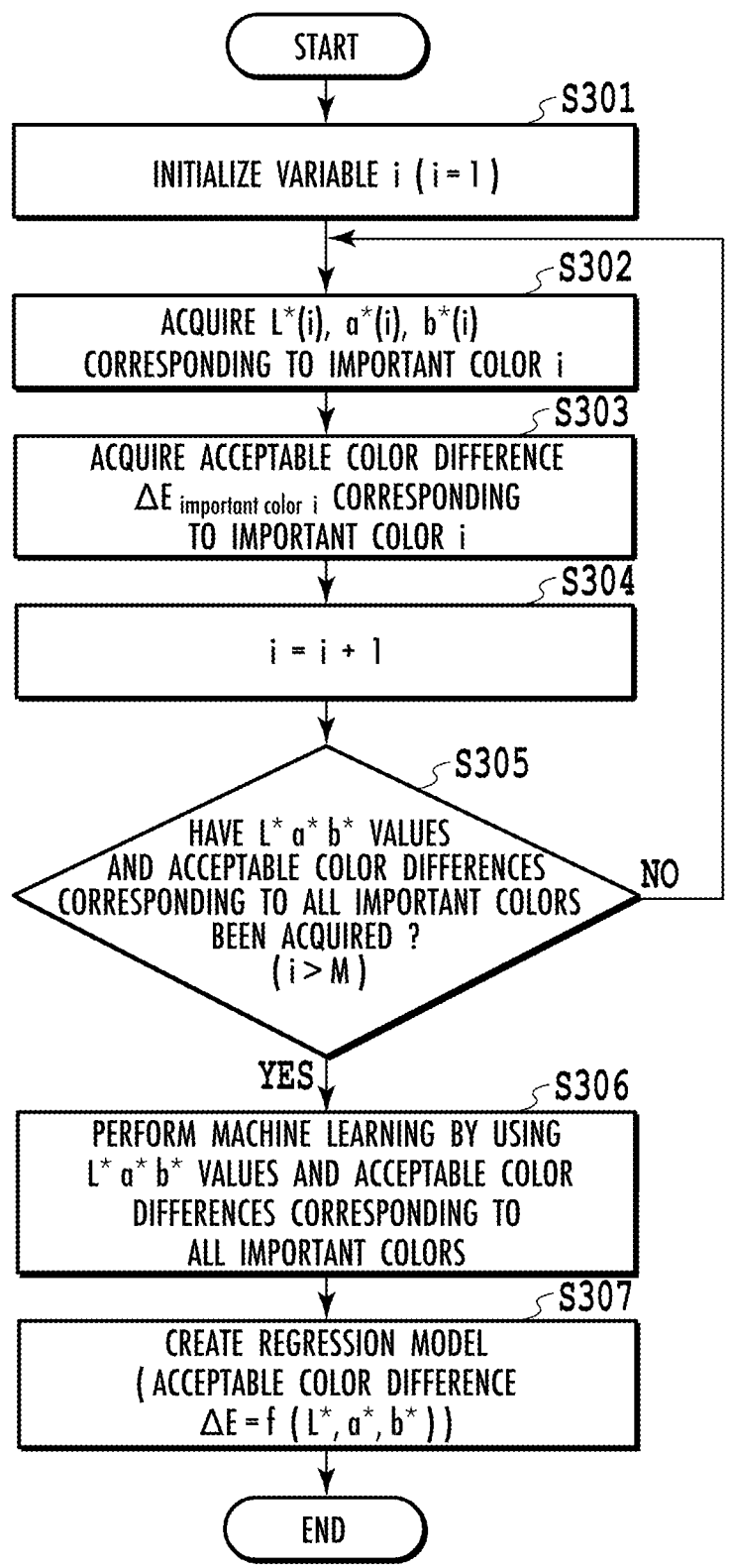
FIG. 3 is a flowchart of processing to create a regression model in the first embodiment.

First, the creation of the regression model (First step) is explained by using FIG. 3. FIG. 3 is a detailed flowchart of First step (creation of the regression model).

At step S301, the acceptable color difference derivation unit 21 initializes a variable i (sets variable i to 1).

At step S302, the acceptable color difference derivation unit 21 acquires each value of L* (i), a* (i), and b* (i) corresponding to the ith important color (important color i) by using a table (Table 4) that holds the L*a*b* values corresponding to the important color stored in the storage unit 14. In the present embodiment, the total number of important colors is represented by M.

TABLE 4

| Important color | L*a*b* values |
|---|---|
| important color 1 | L* (1), a* (1), b* (1) |
| important color 2 | L* (2), a* (2), b* (2) |
| ... | ... |
| important color M | L* (M), a* (M), b* (M) |

At step S303, the acceptable color difference derivation unit 21 acquires the acceptable color difference corresponding to the important color i by using a table (Table 5) that holds the acceptable color difference corresponding to the important color stored in the storage unit 14. In the present embodiment, the acceptable color difference corresponding to the important color i is presented by $\Delta E_{important\ color\ i}$.

TABLE 5

| Important color | Acceptable color difference |
|---|---|
| important color 1 | acceptable color difference $\Delta E_{important\ color\ 1}$ |
| important color 2 | acceptable color difference $\Delta E_{important\ color\ 2}$ |
| ... | ... |
| important color M | acceptable color difference $\Delta E_{important\ color\ M}$ |

However, the derivation method of the acceptable color difference corresponding to the importance color is not limited to the method described above. For example, it may also be possible to determine the acceptable color difference corresponding to the important color by having a user perform a panel test, or to determine the acceptable color difference corresponding to the important color by referring to the JIS standard or the examples and the like that are used commonly.

At step S304, the acceptable color difference derivation unit 21 increments i.

At step S305, the acceptable color difference derivation unit 21 determines whether each value of L*, a*, and b* and the acceptable color differences corresponding to all the important colors have been acquired (whether i>M is satisfied). In the case where the results of the determination at step S305 are affirmative, the processing advances to step S306. On the other hand, in the case where the results of the determination are negative, the processing returns to step S302.

At step S306, the acceptable color difference derivation unit 21 performs machine learning by using each value of L*, a*, and b* and the acceptable color differences corresponding to all the important colors.

At step S307, the acceptable color difference derivation unit 21 creates a regression model capable of deriving the acceptable color difference by using the results at step S306. The regression model that is created at this step is a function f as expressed by expression (2), which calculates an acceptable color difference ΔE by taking each value of L*, a*, and b* as an input value.

$$\Delta E = f(L^*, a^*, b^*) \qquad \text{expression (2)}$$

By the above processing, the acceptable color difference derivation unit 21 creates the regression model (function f). Due to this, it is made possible to input each value of L*, a*, and b* of an arbitrary color to the regression model and to calculate the acceptable color difference ΔE corresponding thereto, and therefore, it is made possible to calculate the acceptable color difference corresponding to each grid point.

Figure 4:
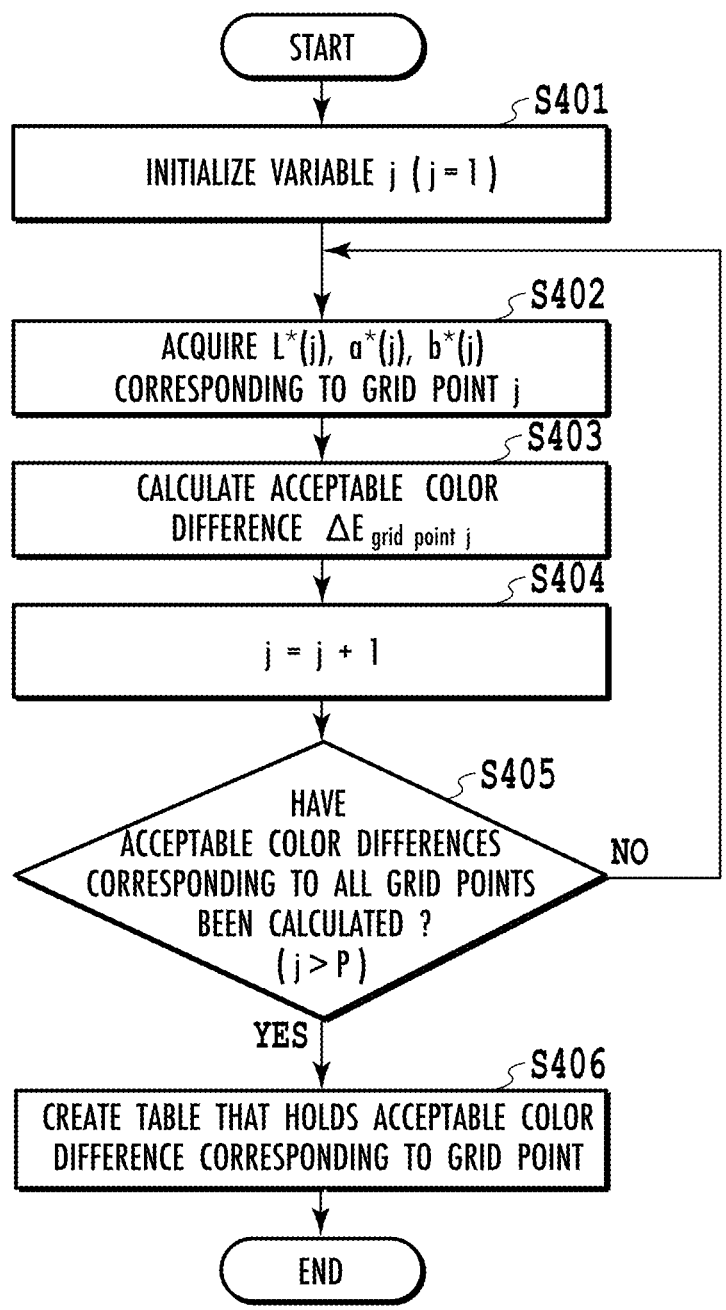
FIG. 4 is a flowchart of processing to create a table that holds an acceptable color difference corresponding to a grid point in the first embodiment.

Next, the creation of the table that holds the acceptable color difference corresponding to each grid point (Second step) is explained by using FIG. 4. FIG. 4 is a detailed flowchart of Second step (creation of the table that holds the acceptable color difference corresponding to each grid point).

At step S401, the acceptable color difference derivation unit 21 initializes a variable j (sets variable j to 1).

At step S402, the acceptable color difference derivation unit 21 acquires each value of L* (j), a* (j), and b* (j) corresponding to the jth grid point (grid point j) by using the table that holds the L*a*b* values corresponding to the CMYK values of the original LUT stored in the storage unit 14.

At step S403, the acceptable color difference derivation unit 21 inputs each value of L* (j), a* (j), and b* (j) acquired at step S402 to the regression model and calculates the acceptable color difference $\Delta E_{grid\,point\,j}$ corresponding to the grid point j.

At step S404, the acceptable color difference derivation unit 21 increments j.

At step S405, the acceptable color difference derivation unit 21 determines whether the acceptable color differences corresponding to all the grid points have been calculated (whether j>P is satisfied). In the case where the results of the determination at step S405 are affirmative, the processing advances to step S406. On the other hand, in the case where the results of the determination are negative, the processing returns to step S402.

At step S406, the acceptable color difference derivation unit 21 creates a table that holds the acceptable color difference corresponding to each grid point shown in Table 2 by using the acceptable color difference calculated at step S403 and outputs the table to the CMYK value determination unit 22. The above is the processing that is performed by the acceptable color difference derivation unit 21.

<About Acceptable Color Difference>

Figure 5:
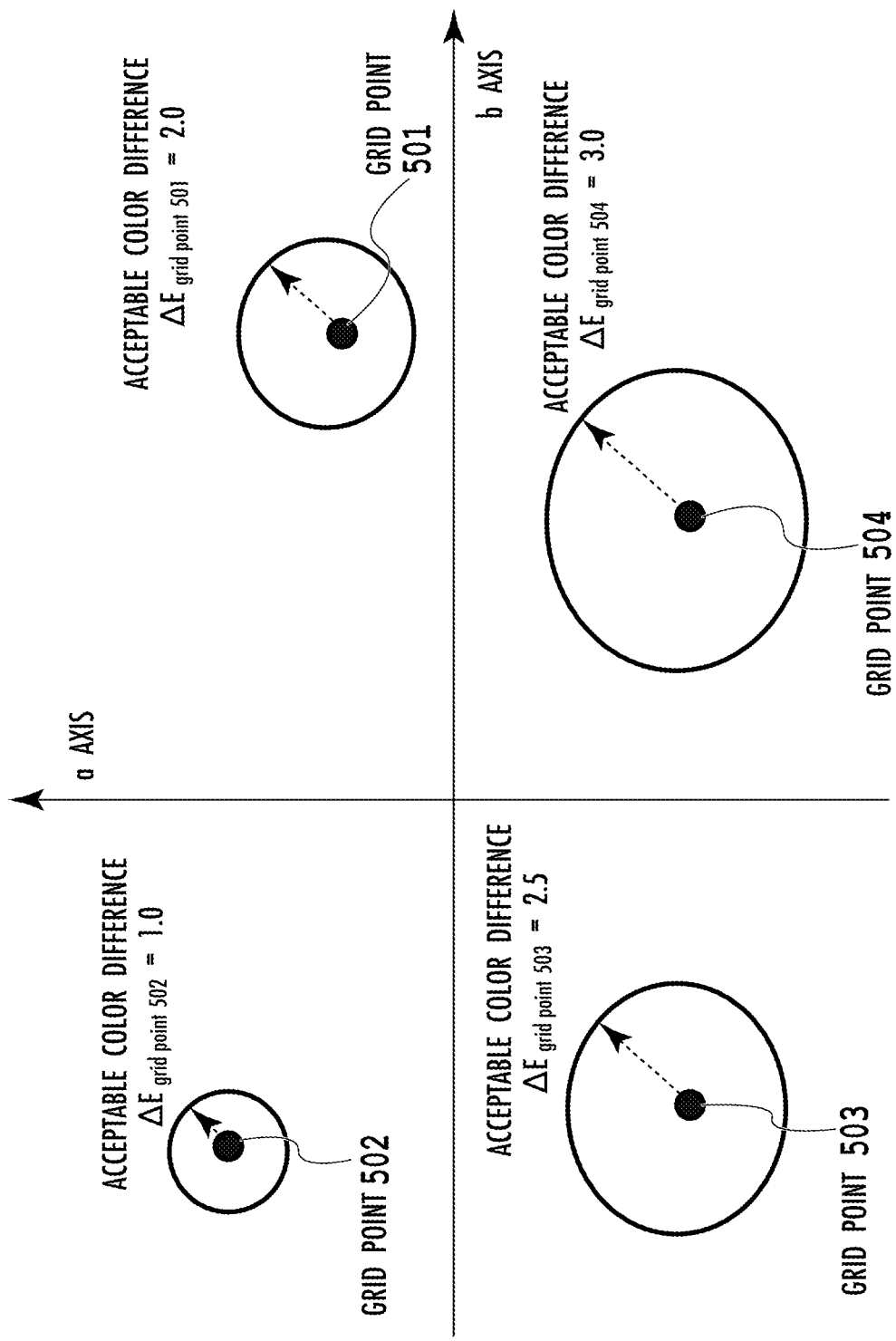
FIG. 5 is a diagram for explaining an acceptable color difference that differs depending on color.

FIG. 5 is a diagram explaining that the acceptable color difference calculated at step S403 differs depending on color. The acceptable color difference is determined by the feature of color, and therefore, the acceptable color difference corresponding to each grid point differs from one another. As an example, referring to FIG. 5, the acceptable color difference corresponding to a grid point 501 is 2.0, the acceptable color difference corresponding to a grid point 502 is 1.0, the acceptable color difference corresponding to a grid point 503 is 2.5, and the acceptable color difference corresponding to a grid point 504 is 3.0. In this manner, the acceptable color differences different for different grid points are calculated.

<About CMYK Value Determination Unit>

Figure 6:
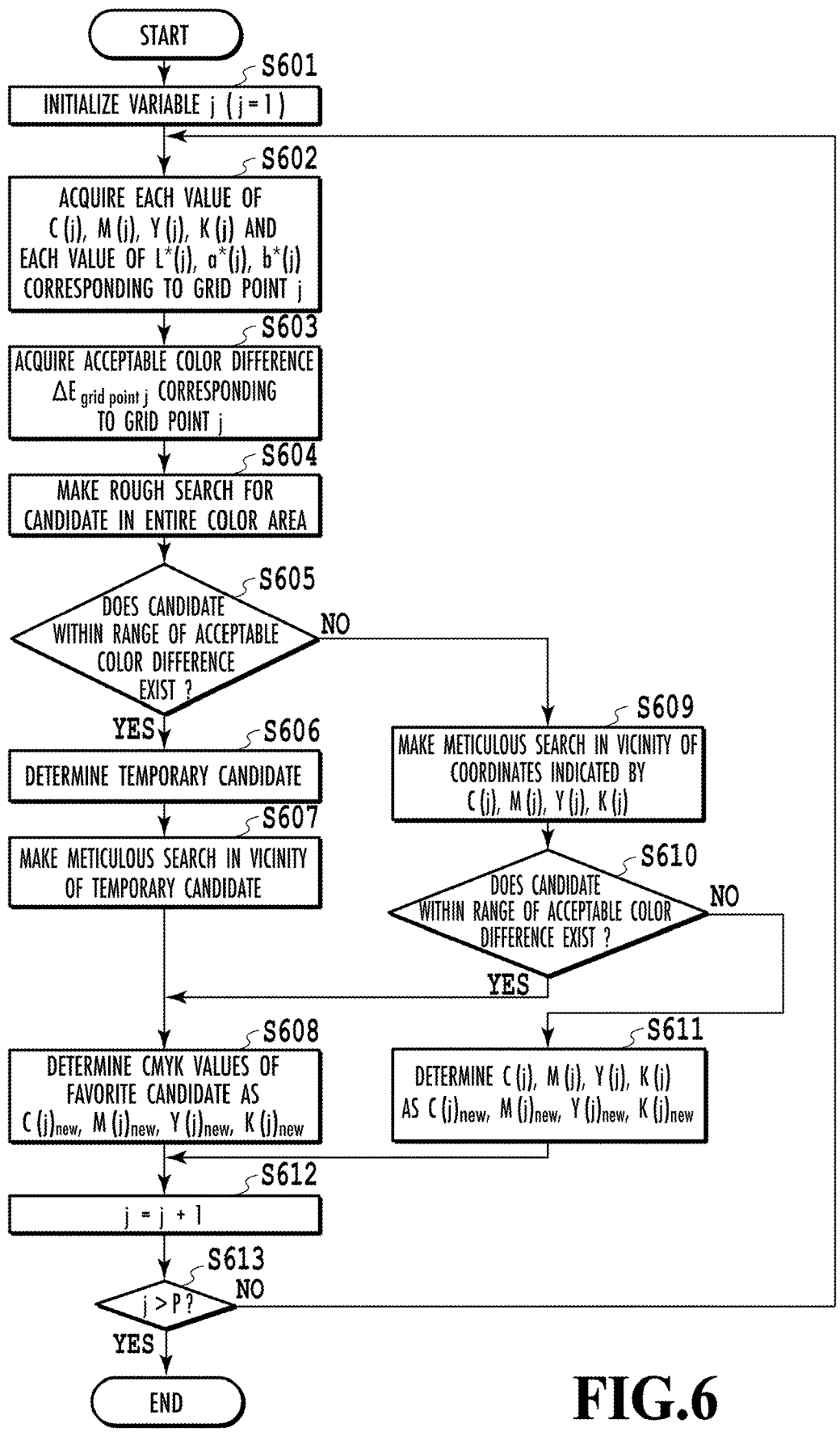
FIG. 6 is a flowchart of processing that is performed by a CMYK value determination unit 22 in the first embodiment.

In the following, the CMYK value determination unit 22 is explained. FIG. 6 is a flowchart of processing that is performed by the CMYK value determination unit 22.

At step S601, the CMYK value determination unit 22 initializes the variable j (sets variable j to 1).

At step S602, the CMYK value determination unit 22 acquires each value below by suing the table that holds the L*a*b* values corresponding to the CMYK values of the original LUT stored in the storage unit 14. Each value below is, in other words, each value of C (j), M (j), Y (j), and K (j) and each value of L* (j), a* (j), and b* (j) corresponding to the grid point j.

At step S603, the CMYK value determination unit 22 acquires the acceptable color difference $\Delta E_{grid\,point\,j}$ by using the table created by the acceptable color difference derivation unit 21.

At step S604, the CMYK value determination unit 22 makes a rough search for the CMYK values within the range of acceptable color difference based on each value of C (j) M (j) Y (j) K (j) L* (j) a* (j) b* (j) and $\Delta E_{grid\,point\,j}$ acquired at steps S602 and S603. Specifically, in order to find a candidate whose color difference between the grid point j and the candidate is smaller than the acceptable color difference $\Delta E_{grid\,point\,j}$, a search is made in the entire color area by using an eight-interval candidate table, which holds the CMYK values corresponding to each candidate. The color difference between the color corresponding to the grid point j and the color corresponding to each candidate is calculated by expression (1). Here, the eight-interval candidate table is a table in which the CMYK values that are held (each value is assumed to take one value between 0 and 255) take only values at eight intervals (that is, 0, 8, 16, . . . , 248). A table that holds the L*a*b* values corresponding to each candidate, which are held in the eight-interval candidate table, is stored in the storage unit 14 and it may also be possible to make up the image forming apparatus 1 so as to perform this step by using this table. Further, in the present embodiment, making a search only for the candidate held in the eight-interval candidate table, not for all the combinations of the values (that is, one value between 0 and 255) that can be taken as the CMYK values, is defined as "making a rough search". An example of the eight-interval candidate table is shown in Table 6.

TABLE 6

|  | C value | M value | Y value | K value |
|---|---|---|---|---|
| candidate 1 | 0 | 0 | 0 | 0 |
| candidate 2 | 0 | 0 | 0 | 8 |

TABLE 6-continued

|  | C value | M value | Y value | K value |
|---|---|---|---|---|
| ... | ... | ... | ... | ... |
| candidate N − 1 | 248 | 248 | 248 | 240 |
| candidate N | 248 | 248 | 248 | 248 |

Here, the total number of candidates is represented by N. The table that is used at the time of making a rough search at this step is not limited to the eight-interval candidate table and for example, it may also be possible to make a rough search in the entire color area by using a four-interval candidate table in which the CMYK values take only values at four intervals.

At step S605, the CMYK value determination unit 22 determines whether a candidate within the range of the acceptable color difference $\Delta E_{grid\ point\ j}$ exists, the center of the range being the coordinates indicated by each value of L* (j), a* (j), and b* (j) corresponding to the grid point j. In the case where the results of the determination at step S605 are affirmative, the processing advances to step S606. On the other hand, in the case where the results of the determination are negative, the processing advances to step S609.

At step S606, the CMYK value determination unit 22 determines a combination of CMYK values, which minimizes the sum of each value of CMYK, to be a temporary candidate, among the candidates within the range of the acceptable color difference $\Delta E_{grid\ point\ j}$, the center of the range being the coordinates indicated by each value of L* (j), a* (j), and b* (j) corresponding to the grid point j.

At step S607, the CMYK value determination unit 22 makes a meticulous search in the vicinity of the temporary candidate determined at step S606. Specifically, in the case where each of the CMYK values of the temporary candidate is taken to be C', M', Y', and K', by making a meticulous search within a range (hereinafter, range W) expressed by expression (3), a candidate whose color difference from the grid point j is smaller than the acceptable color difference $\Delta E_{grid\ point\ j}$ is found. In the present embodiment, making a search for all the combinations of the values that the CMYK values can take is defined as "making a meticulous search".

$$W=\{(C,M,Y,K)|C'-8\leq C\leq C'+8, M'-8\leq M\leq M'+8, Y'-8\leq Y\leq Y'+8, K'-8\leq K\leq K'+8\}$$ expression (3)

In the present embodiment, a rough search is made by using an eight-interval candidate database at step S604, and therefore, at this step, a search is made within a range of ±8 of each value of C', M', Y', and K' in the CMYK color space. At the time of making a search within the range W, it may also be possible to make use of the publicly known common optimization algorithm, for example, the binary search, the genetic algorithm, and so on.

At step S608, the CMYK value determination unit 22 determines a combination of CMYK values, which minimizes the sum of each value of CMYK, to be new CMYK values corresponding to the grid point j, among the candidates within the range of the acceptable color difference $\Delta E_{grid\ point\ j}$, the center of the range being the coordinates indicated by each value of L* (j), a* (j), and b* (j). Each of the CMYK values newly determined is taken to be C (j)$_{new}$, M (j)$_{new}$, Y (j)$_{new}$, and K (j)$_{new}$.

At step S609, the CMYK value determination unit 22 makes a meticulous search in the vicinity of the coordinates indicated by each value of C (j), M (j), Y (j), and K (j) in the CMYK color space. The range in which a search is made at this step is similarly set to the range W and in the CMYK color space, a search is made within the range of ±8 of each value of C (j), M (j), Y (j), and K (j). Further, as at step S607, at the time of search, it may also be possible to make use of the publicly know common optimization algorithm.

At step S610, the CMYK value determination unit 22 determines whether a candidate within the range of the acceptable color difference $\Delta E_{grid\ point\ j}$ exists, the center of the range being the coordinates indicated by each value of L* (j), a* (j), and b* (j) corresponding to the grid point j. In the case where the results of the determination at step S610 are affirmative, the processing advances to step S608. On the other hand, in the case where the results of the determination are negative, the processing advances to step S611.

At step S611, the CMYK value determination unit 22 determines C (j), M (j), Y (j), and K (j) as the new CMYK values, that is, C (j)$_{new}$, M (j)$_{new}$, Y (j)$_{new}$, and K (j)$_{new}$.

At step S612, the CMYK value determination unit 22 increments j.

At step S613, the CMYK value determination unit 22 determines whether the new CMYK values corresponding to all the grid points have been determined (whether, j>P is satisfied). In the case where the results of the determination at step S613 are affirmative, the series of processing ends. On the other hand, in the case where the results of the determination are negative, the processing returns to step S602. The above is the processing that is performed by the CMYK value determination unit 22. By the above processing, the CMYK value determination unit 22 derives the new CMYK values, that is, $C_{new}$, $M_{new}$, $Y_{new}$, and $K_{new}$ for all the grid points.

<About LUT Creation Unit>

Figure 7:
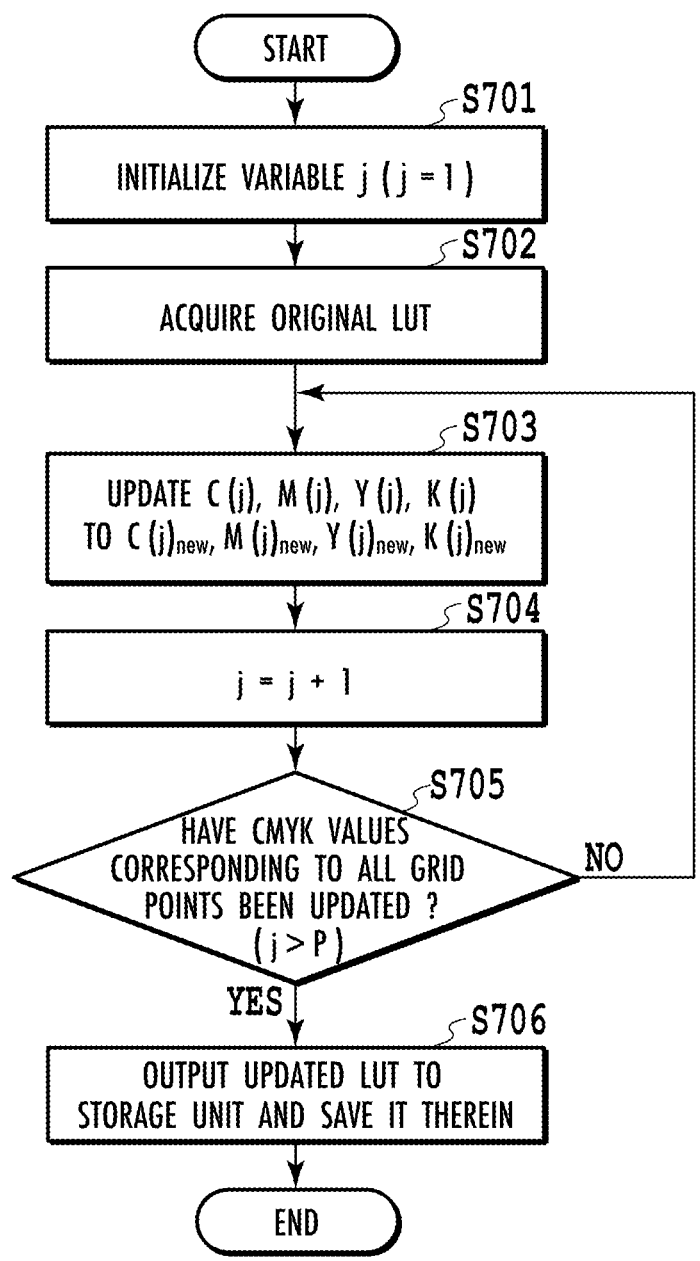
FIG. 7 is a flowchart of processing that is performed by an LUT creation unit 23 in the first embodiment.

In the following, the LUT creation unit 23 is explained. FIG. 7 is a flowchart of processing that is performed by the LUT creation unit 23.

At step S701, the LUT creation unit 23 initializes the variable j (sets variable j to 1).

At step S702, the LUT creation unit 23 acquires the original LUT stored in the storage unit 14.

At step S703, the LUT creation unit 23 updates C (j), M (j), Y (j), and K (j) corresponding to the grid point j of the original LUT to C (j)$_{new}$, M (j)$_{new}$, Y (j)$_{new}$, and K (j)$_{new}$.

At step S704, the LUT creation unit 23 increments j.

At step S705, the LUT creation unit 23 determines whether the CMYK values corresponding to all the grid points have been updated (whether j>P is satisfied). In the case where the results of the determination at step S705 are affirmative, the processing advances to step S706. On the other hand, in the case where the results of the determination are negative, the processing returns to step S703.

At step S706, the LUT creation unit 23 outputs the created updated LUT (see Table 3) to the storage unit 14 and stores it therein. The above is the processing that is performed by the LUT creation unit 23.

In the present embodiment, by using the updated LUT for the toner-saving mode, which is created by the LUT creation unit 23, RGB image data is converted into CMYK image data. Due to this, at the time of producing an output in the toner-saving mode, it is made possible to reduce the toner consumption to the maximum while maintaining the hue of an image.

The case is explained where the RGB color space is used as a color space and toner of each of CMYK is used as a color material, but it is also possible to apply the present embodiment to the case where another color space and another color material are used.

Second Embodiment

In the first embodiment, the acceptable color difference is derived based on only the feature of color. In the present embodiment, a plurality of acceptable color differences is derived for each grid point based on the feature of color and personal information on a user (for example, occupational information indicating the occupation of a user, information indicating preferences of a user, and so on). Then, the acceptable color difference in accordance with the personal information on a user is selectively determined and an updated LUT is created. In the following, differences from the first embodiment are explained mainly and explanation of the same configuration and processing as those of the first embodiment is omitted appropriately.

In the following, the case is explained where occupational information is used as personal information on a user. Table 7 below shows an example of an occupational information table that holds the occupational information number and the contents of occupation corresponding thereto. In Table 7, the total number of pieces of occupational information is represented by Q.

TABLE 7

| Occupational information number | Contents of occupation |
|---|---|
| occupational information 1 | employee of a multi function printer maker |
| occupational information 2 | employee of a publishing company |
| ... | ... |
| occupational information Q | employee of a general company |

<About Configuration of Image Forming Apparatus>

Figure 8A:
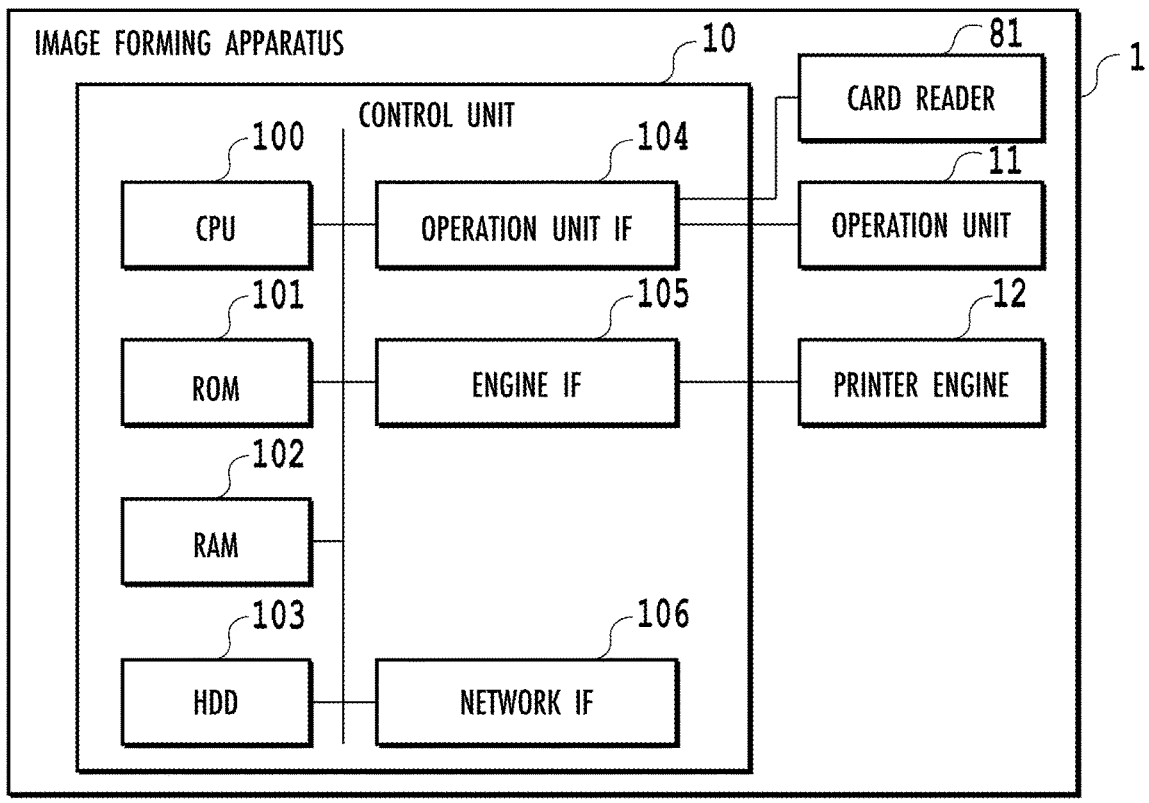
FIG. 8A and FIG. 8B are diagrams showing an outline configuration of the image forming apparatus 1 in a second embodiment.

FIG. 8A is a block diagram showing a hardware configuration of the image forming apparatus 1 in the present embodiment. As shown schematically, the image forming apparatus 1 has a configuration similar to that of the first embodiment, but differs from that of the first embodiment in further having a card reader 81 (see FIG. 1A).

The card reader 81 reads an ID card of a user, who is using the image forming apparatus 1, by the image forming apparatus 1 by using a technique, such as near field radio communication (hereinafter, NFC). Due to this, the image forming apparatus 1 acquires occupational information on the user who is using the image forming apparatus 1. It may also be possible to make up the image forming apparatus 1 so as to acquire occupational information on a user by using another technique without using the NFC or ID card.

Figure 8B:
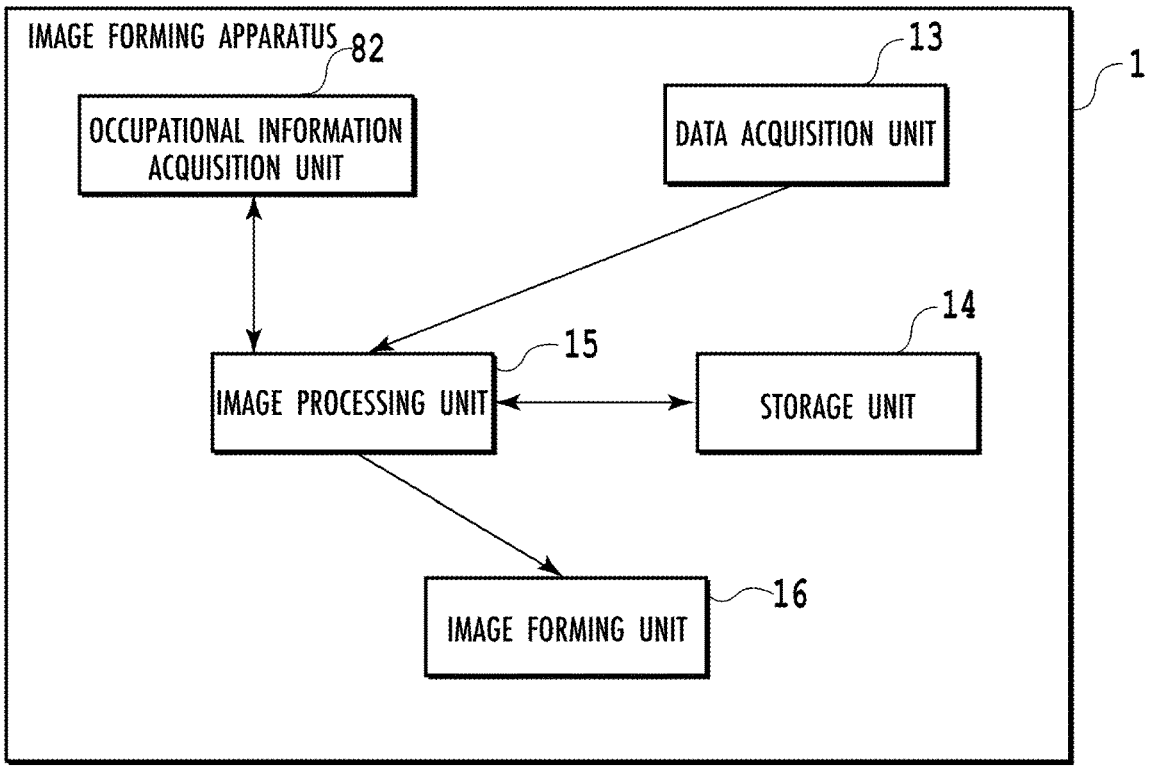

FIG. 8B is a diagram showing a function configuration of the image forming apparatus 1 in the present embodiment. As shown schematically, the image forming apparatus 1 has a configuration similar to that of the first embodiment, but differs from that of the first embodiment in further having an occupational information acquisition unit 82 (see FIG. 1B). The occupational information acquisition unit 82 acquires the occupational information on a user read by the card reader 81 and outputs the information to the image processing unit 15. In the present embodiment, explanation is given on the assumption that the data acquisition unit 13 and the occupational information acquisition unit 82 are separate configurations, but there may be a configuration in which the data acquisition unit 13 includes the occupational information acquisition unit 82.

<About Image Processing Unit>

Figure 9:
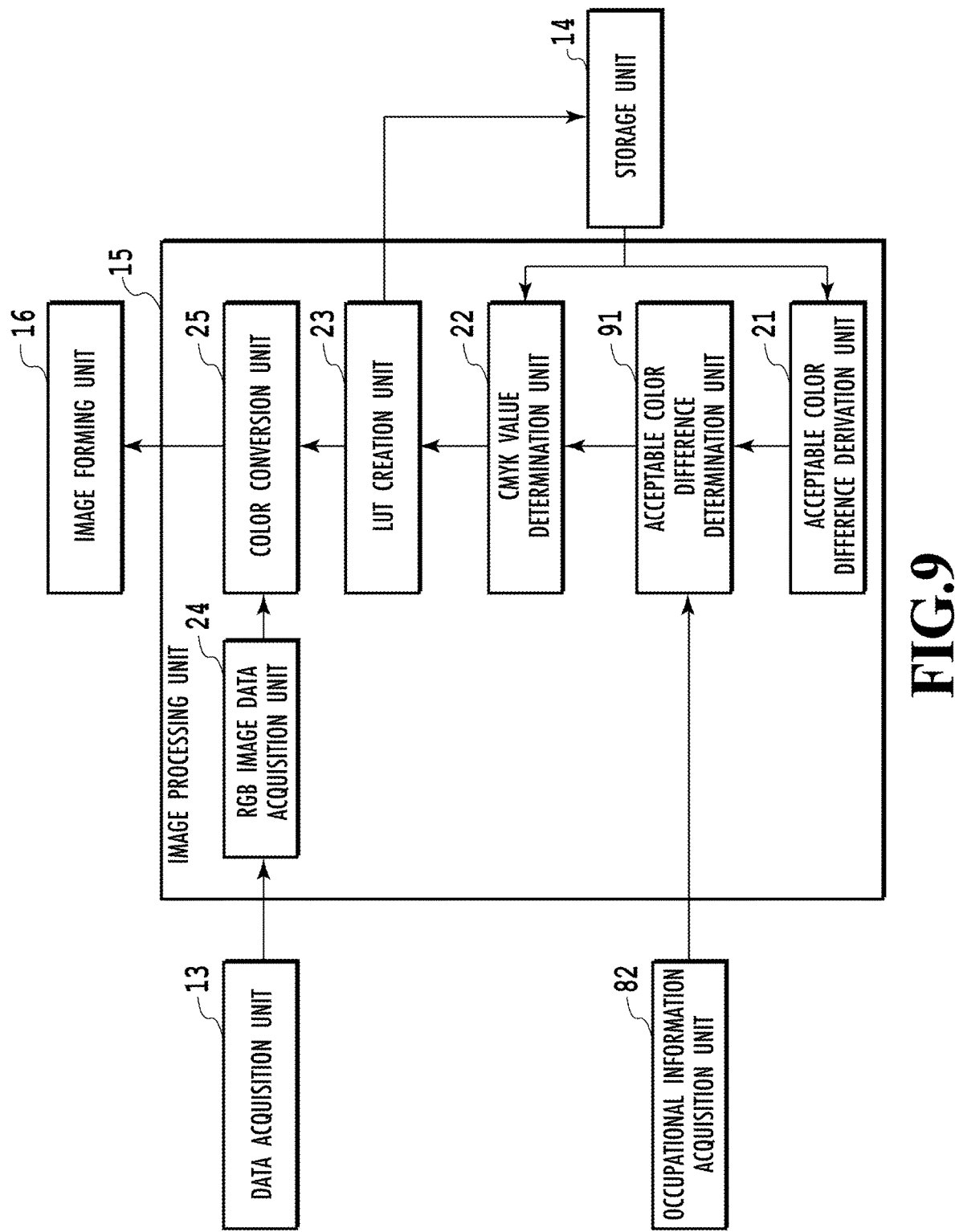
FIG. 9 is a diagram for explaining the image processing unit 15 in the second embodiment.

In the following, the image processing unit 15 in the present embodiment is explained by using FIG. 9. As shown schematically, the image processing unit 15 in the present embodiment has a configuration similar to that of the first embodiment, but differs from that of the first embodiment in further having an acceptable color difference determination unit 91 (see FIG. 2).

The acceptable color difference derivation unit 21 of the first embodiment creates the table that holds the acceptable color difference corresponding to each grid point in the RGB space based on only the feature of color. In contrast to this, the acceptable color difference derivation unit 21 of the present embodiment acquires occupational information by using the occupational information table stored in the storage unit 14 and creates a table that holds the acceptable color difference corresponding to the occupational information and the grid point based on the acquired occupational information and the feature of color. Specifically, the acceptable color difference derivation unit 21 performs the same processing as that in FIG. 3 of the first embodiment and creates a regression model for each occupation, which enables a calculation of the acceptable color difference across the entire color area. The regression model that is created here is a function g as expressed by expression (4), which calculates the acceptable color difference ΔE by taking the occupational information and each value of L*, a*, and b* as input values.

$$\Delta E = g(\text{occupational information}, L^*, a^*, b^*) \quad \text{expression (4)}$$

By the above processing, the acceptable color difference derivation unit 21 creates the regression model (function g). As expressed by expression (4), for the same grid point (the same L*a*b* values), a plurality of acceptable color differences different depending on the occupation exists, and this is the feature of the present embodiment.

Next, the acceptable color difference derivation unit 21 calculates the acceptable color difference corresponding to each grid point for each occupation by using the created regression model g, creates a table that holds the acceptable color difference corresponding to the occupational information and the grid point, and outputs the table to the acceptable color difference determination unit 91. An example of the table that is created by the acceptable color difference derivation unit 21 and which holds the acceptable color difference corresponding to the occupational information and the grid point is shown in Table 8.

TABLE 8

| | Acceptable color difference | | | |
|---|---|---|---|---|
| Grid point | employee of a multi function printer maker | employee of a publishing company | ... | employee of a general company |
| grid point 1 | $\Delta E_{grid\ point\ 11}$ | $\Delta E_{grid\ point\ 12}$ | ... | $\Delta E_{grid\ point\ 1Q}$ |
| grid point 2 | $\Delta E_{grid\ point\ 21}$ | $\Delta E_{grid\ point\ 22}$ | ... | $\Delta E_{grid\ point\ 2Q}$ |
| ... | ... | ... | ... | ... |
| grid point P | $\Delta E_{grid\ point\ P1}$ | $\Delta E_{grid\ point\ P2}$ | ... | $\Delta E_{grid\ point\ PQ}$ |

The occupational information acquisition unit 82 acquires the occupational information on a user read by the card reader 81 and outputs the occupational information to the acceptable color difference determination unit 91.

The acceptable color difference determination unit of the present embodiment selectively determines the acceptable color difference suitable to a user for each grid point based on the occupational information output from the occupational information acquisition unit 82 and the table that holds the acceptable color difference corresponding to the occupational information and the grid point, which is output from the acceptable color difference derivation unit 21. For example, in the case where the occupational information number acquired by the acceptable color difference determination unit 91 is occupational information 1 indicating that the user is an employee of a multi function printer company, the acceptable color difference determination unit 91 selects the acceptable color difference $\Delta E_{grid\ point\ 11}$ from Table 8 for grid point 1. As described above, it is possible for the acceptable color difference determination unit 91 to determine the acceptable color difference for each grid point suitable to the user based on the occupational information on the user who is using the image forming apparatus 1. Next, based on the determined acceptable color difference, the acceptable color difference determination unit 91 creates the table (see Table 2) that holds the acceptable color difference corresponding to each grid point in the RGB space and outputs the table to the CMYK value determination unit 22.

Next, the CMYK value determination unit 22 performs the same processing as that of the first embodiment by using the table that holds the acceptable color difference for each grid point, which is output from the acceptable color difference determination unit 91, and determines new CMYK values corresponding to each grid point.

The LUT creation unit 23, the RGB image data acquisition unit 24, and the color conversion unit 25 are the same as those of the first embodiment, and therefore, explanation thereof is omitted.

In the present embodiment, the image processing unit 15 creates an updated LUT by also taking into consideration the personal information (occupational information and the like) on a user, in addition to the feature of color. Due to this, it is made possible to appropriately reduce toner consumption in accordance with a user while maintaining the hue of an image at the time of producing an output in the toner-saving mode.

Third Embodiment

In the first embodiment and the second embodiment, the acceptable color difference that is necessary at the time of determining new CMYK values for an updated LUT is determined, but reception of instructions from a user about color conversion at the time of the determination is not supposed. The image forming apparatus of the present embodiment acquires instructions of a user about color conversion (hereinafter, user setting information) and determines the acceptable color difference that is necessary at the time of determining new CMYK values for an updated LUT based on the user setting information. In the following, differences from the above-described embodiments are explained mainly and explanation of the same configuration and processing as those of the above-described embodiments is omitted appropriately.

<About Configuration of Image Forming Apparatus>

Figure 10A:
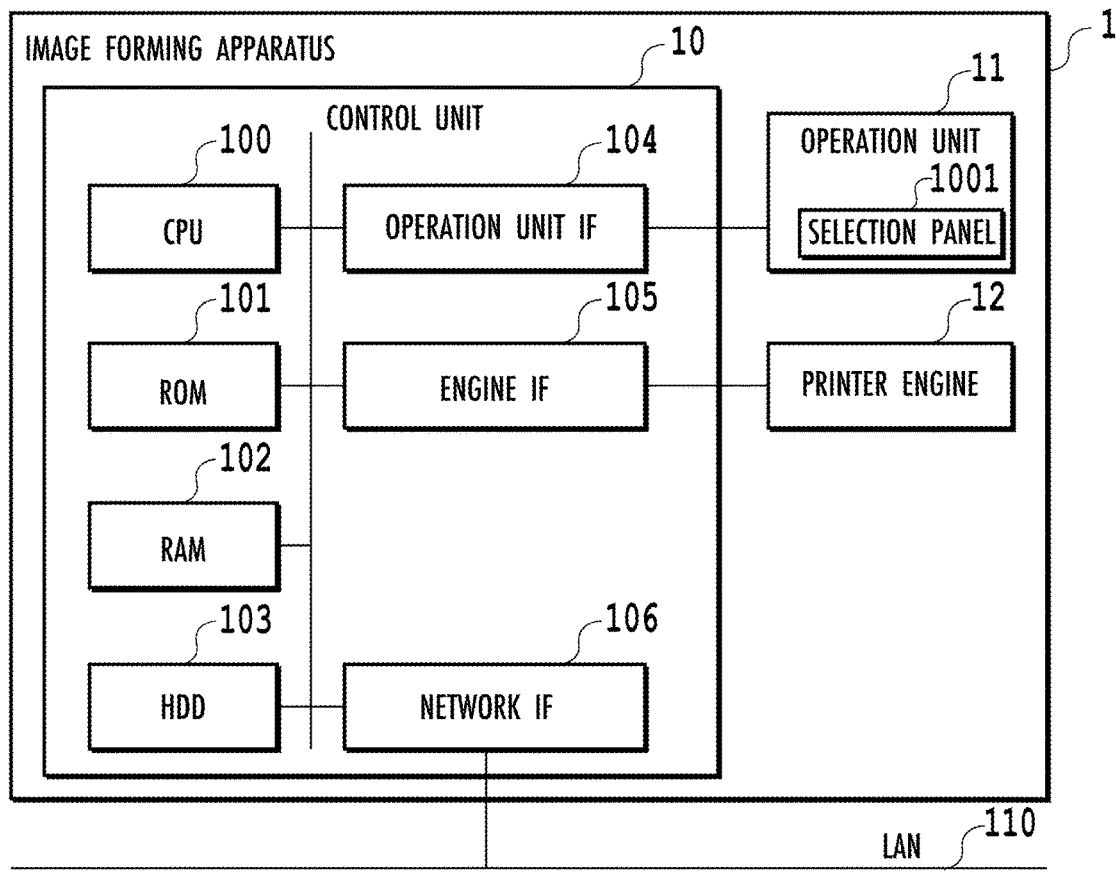
FIG. 10A and FIG. 10B are diagrams showing an outline configuration of the image forming apparatus 1 in a third embodiment.

FIG. 10A is a block diagram showing a hardware configuration of the image forming apparatus 1 in the present embodiment. As shown schematically, the image forming apparatus 1 has a configuration similar to that of the first embodiment, but differs from that of the first embodiment in that the operation unit 11 has a selection panel 1001 (see FIG. 1A). A user inputs user setting information, specifically, toner-saving mode ON/OFF information indicating whether or not printing is performed in the toner-saving mode and an acceptable color difference level specifying the magnitude of an acceptable color difference via the selection panel 1001.

Figure 10B:
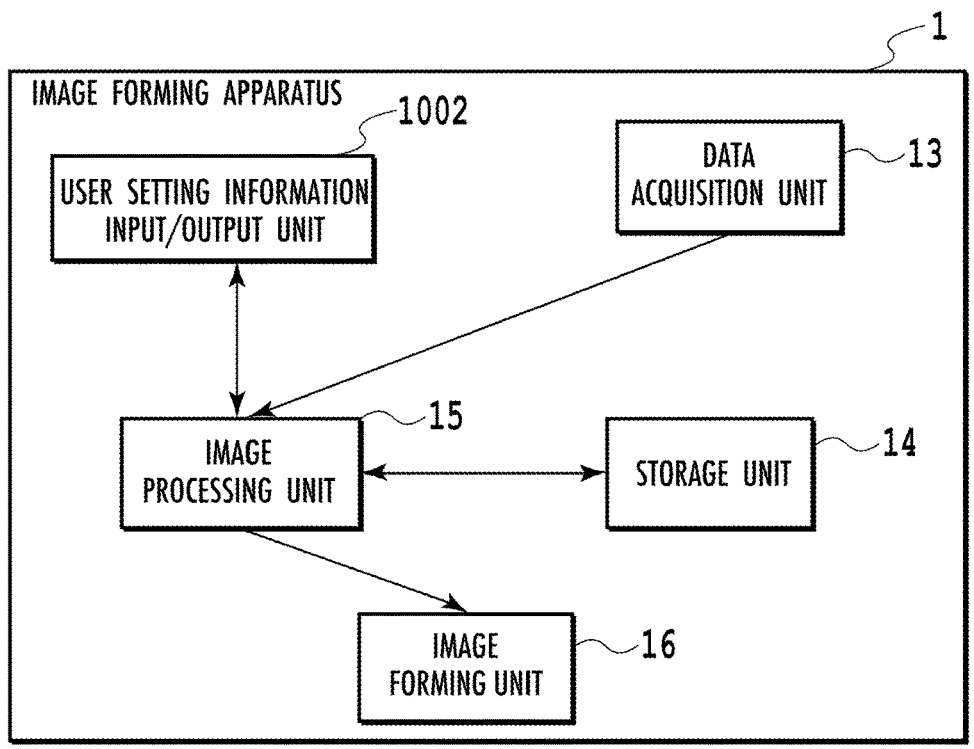

FIG. 10B is a diagram showing a function configuration of the image forming apparatus 1 in the present embodiment. As shown schematically, the image forming apparatus 1 has a configuration similar to that of the first embodiment, but differs from that of the first embodiment in further having a user setting information input/output unit 1002 (see FIG. 1B). The user setting information input/output unit 1002 is implemented by the selection panel 1001 and the like, and acquires instructions (user setting information) input by a user and outputs the instructions to the image processing unit 15.

<About UI Screen>

Figure 11:
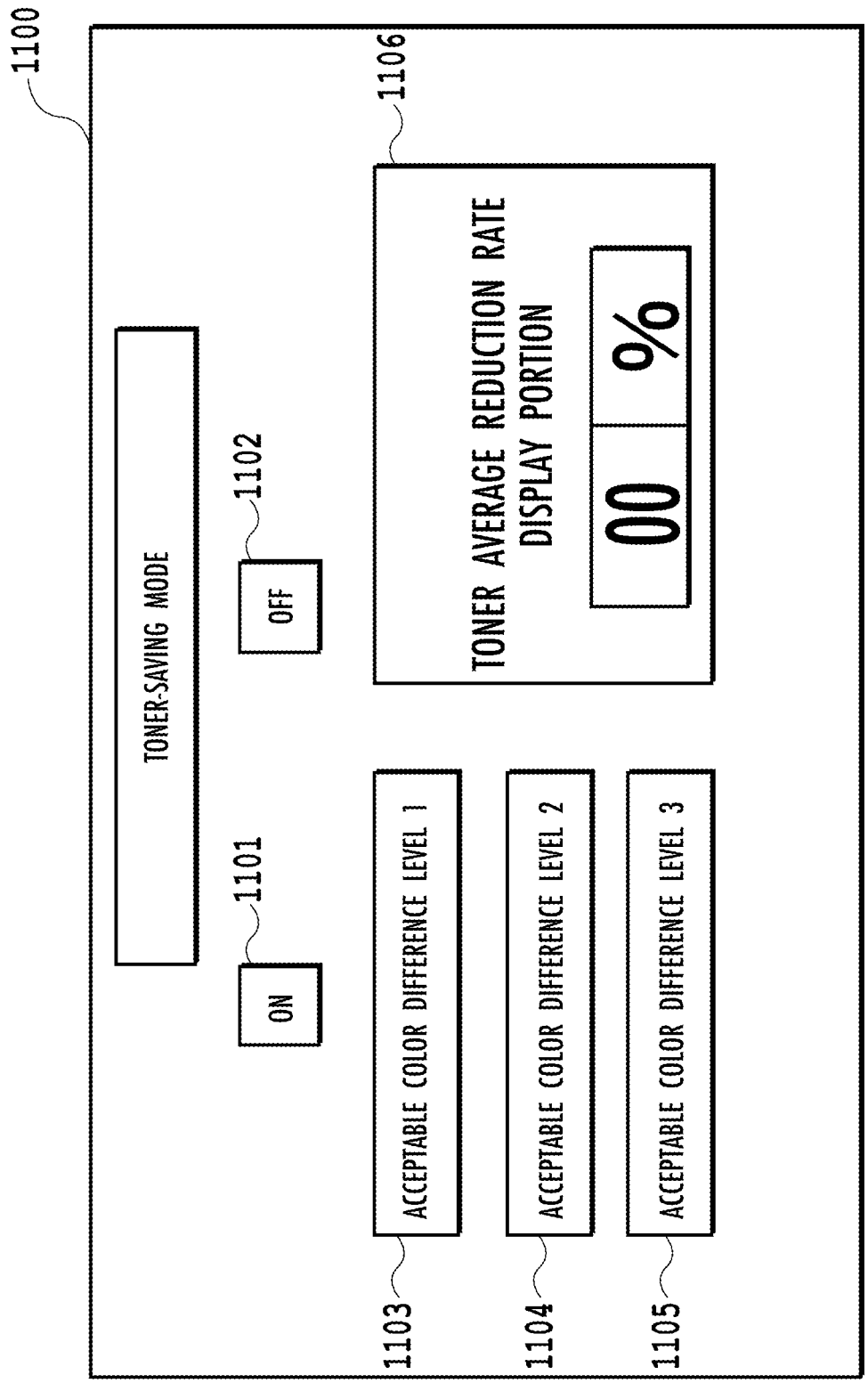
FIG. 11 is a diagram showing a UI screen in the third embodiment.

FIG. 11 is a diagram showing an example of a UI screen that is displayed on the selection panel 1001. As shown schematically, a UI screen 1100 has an "ON" button 1101, an "OFF" button 1102, an "Acceptable color difference level 1" button 1103, an "Acceptable color difference level 2" button 1104, an "Acceptable color difference level 3" button 1105, and a toner average reduction rate display portion 1106.

A user presses down the "ON" button 1101 in the case of performing printing in the toner-saving mode and on the other hand, presses down the "OFF" button 1102 in the case of performing printing in the normal mode. In the state where the "ON" button 1101 is pressed down, it is possible to press down one of the "Acceptable color difference level 1" button 1103, the "Acceptable color difference level 2" button 1104, and the "Acceptable color difference level 3" button 1105. A user specifies the degree of toner saving by pressing down one of these buttons.

On the toner average reduction rate display portion 1106, a toner average reduction rate indicating how many percent the CMYK toner consumption can be reduced on average is displayed based on the processing results of the image processing unit 15. For example, in the case where the "Acceptable color difference level 1" button 1103 is pressed down, 5% is displayed, in the case where the "Acceptable color difference level 2" button 1104 is pressed down, 10% is displayed, and in the case where the "Acceptable color difference level 3" button 1105 is pressed down, 15% is displayed. It may also be possible to make up the image forming apparatus 1 so that it is possible for a user to grasp in advance how much toner can be saved before performing printing by viewing the value that is displayed on the toner average reduction rate display portion 1106.

Here, the case where the UI screen has three buttons to specify the degree of toner saving is explained, but the number of buttons is not limited to three and the UI screen may have any number of buttons to specify the degree of toner saving.

<About Image Processing Unit>

Figure 12:
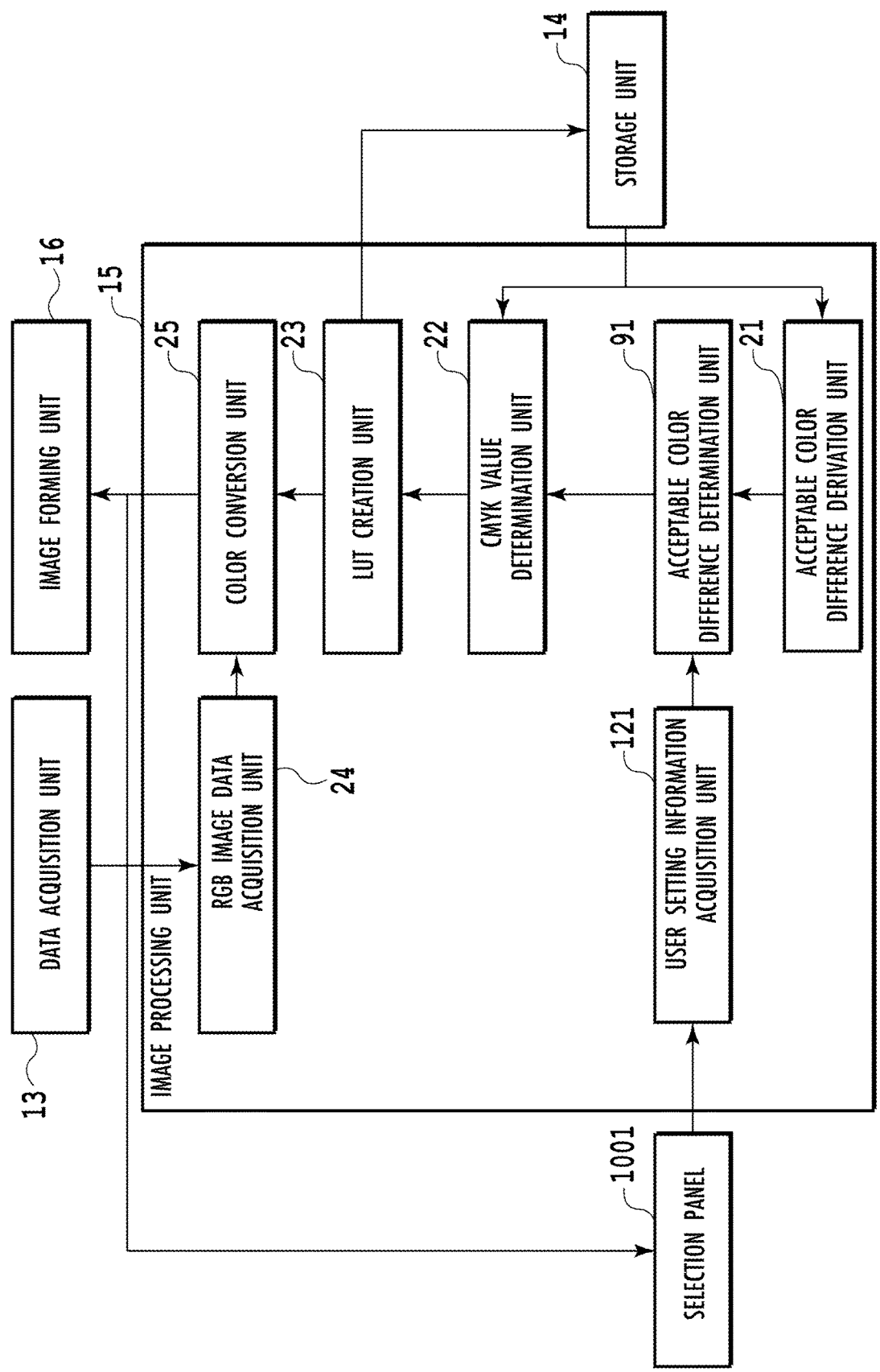
FIG. 12 is a diagram for explaining the image processing unit 15 in the third embodiment.

In the following, the image processing unit 15 in the present embodiment is explained by using FIG. 12. As shown schematically, the image processing unit 15 in the present embodiment has a configuration similar to that of the first embodiment, but differs from that of the first embodiment in further having the user setting information acquisition unit 121 and the acceptable color difference determination unit 91 (see FIG. 2).

In the first embodiment, the table that holds the acceptable color difference corresponding to each grid point in the RGB space is created based on only the feature of color. In contrast to this, the acceptable color difference derivation unit 21 of the present embodiment acquires information on the acceptable color difference level set in advance, which is stored in the storage unit 14. Then, based on the acquired information on the acceptable color difference level and the feature of color, a table that holds the acceptable color difference corresponding to the acceptable color difference level and the grid point is created. Specifically, the acceptable color difference derivation unit 21 performs the same processing as that in FIG. 3 of the first embodiment and creates a regression model that enables a calculation of the acceptable color difference for each acceptable color difference level across the entire color area. The regression model that is created here is a function h as expressed by expression (5), which calculates the acceptable color difference ΔE by taking the acceptable color difference level and each value of L*, a*, and b* as input values.

$$\Delta E = h(\text{acceptable color difference level}, L^*, a^*, b^*) \quad \text{expression (5)}$$

By the above processing, the acceptable color difference derivation unit 21 creates the regression model (function h). As expressed by expression (5), for the same grid point (the same L*a*b* values), a plurality of acceptable color differences different depending on the acceptable color difference level exists and this is the feature of the present embodiment.

Next, the acceptable color difference derivation unit 21 calculates the acceptable color difference corresponding to the grid point for each acceptable color difference level by using the created regression model h, creates a table that holds the acceptable color difference corresponding to the acceptable color difference level and the grid point, and outputs the table to the acceptable color difference determination unit 91. An example of the table that holds the acceptable color difference corresponding to the acceptable color difference level and the grid point, which is created by the acceptable color difference derivation unit 21, is shown in Table 9.

TABLE 9

| | Acceptable color difference level | | | |
|---|---|---|---|---|
| Grid point | level 0 | level 1 | level 2 | level 3 |
| grid point 1 | 0 | $\Delta E_{grid\ point\ 11}$ | $\Delta E_{grid\ point\ 12}$ | $\Delta E_{grid\ point\ 13}$ |
| grid point 2 | 0 | $\Delta E_{grid\ point\ 21}$ | $\Delta E_{grid\ point\ 22}$ | $\Delta E_{grid\ point\ 23}$ |
| ... | ... | ... | ... | ... |
| grid point P | 0 | $\Delta E_{grid\ point\ P1}$ | $\Delta E_{grid\ point\ P2}$ | $\Delta E_{grid\ point\ P3}$ |

As shown in Table 9, in the present embodiment, in the state where the acceptable color difference level is level 0, the acceptable color differences corresponding to all the grid points are 0.

The user setting information acquisition unit 121 acquires the user setting information input by a user via the selection panel 1001 and outputs the user setting information to the acceptable color difference determination unit 91. The user setting information includes toner-saving mode ON/OFF information, information on the acceptable color difference level, and so on.

Figure 13:
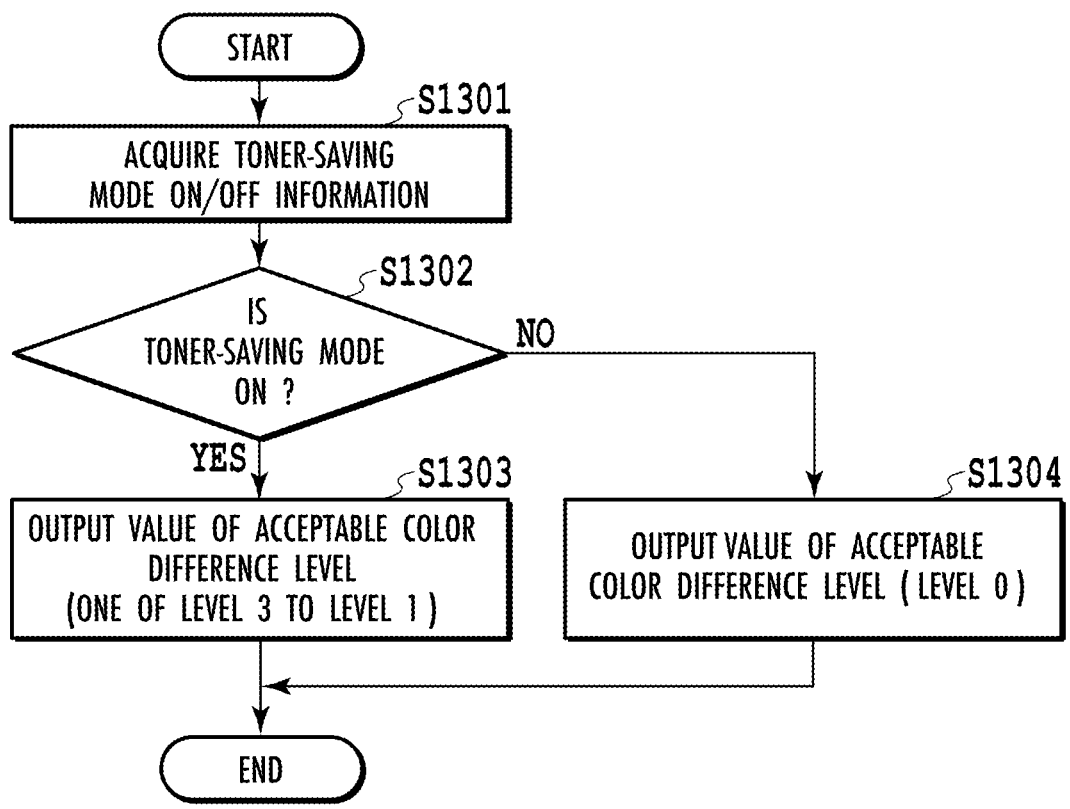
FIG. 13 is a flowchart of processing that is performed by a user setting information acquisition unit 121 in the third embodiment.

In the following, the user setting information acquisition unit 121 is explained by using FIG. 13. FIG. 13 is a flowchart of processing that is performed by the user setting information acquisition unit 121.

At step S1301, the user setting information acquisition unit 121 acquires the toner-saving mode ON/OFF information that is input by a user via the selection panel 1001 and which is output from the user setting information input/output unit 1002.

At step S1302, the user setting information acquisition unit 121 determines whether the toner-saving mode is set to ON based on the toner-saving mode ON/OFF information acquired at step S1301. In the case where the results of the determination at step S1302 are affirmative, the processing advances to step S1303. On the other hand, in the case where the results of the determination are negative, the processing advances to step S1304.

At step S1303, the user setting information acquisition unit 121 outputs the information on the acceptable color difference level (that is, information indicating one of levels 1 to 3) that is input by a user to the acceptable color difference determination unit 91.

At step S1304, the user setting information acquisition unit 121 outputs the information indicating that the acceptable color difference level is 0 to the acceptable color difference determination unit 91. As described above, in the case where the acceptable color difference level is 0, the acceptable color differences corresponding to all the grid points are 0, and therefore, it is unlikely that the toner consumption at the time of printing is reduced. The above is the processing that is performed by the user setting information acquisition unit 121.

The acceptable color difference determination unit 91 selectively determines the acceptable color difference in accordance with instructions of a user for each grid point based on the user setting information output from the user setting information acquisition unit 121 and the table output from the acceptable color difference derivation unit 21. For example, in the case where the acceptable color difference level acquired by the acceptable color difference determination unit 91 is 1, the acceptable color difference determination unit 91 selects the acceptable color difference $\Delta E_{grid\ point\ 11}$ from Table 9 for grid point 1. In this manner, it is possible for the acceptable color difference determination unit 91 to determine the acceptable color difference of the grid point based on instructions of a user. Next, based on the determined acceptable color difference, the acceptable color difference determination unit 91 creates a table that holds the acceptable color difference corresponding to each grid point in the RGB space and outputs the table to the CMYK value determination unit 22.

Next, the CMYK value determination unit 22 performs the same processing as that of the first embodiment by using the table that holds the acceptable color difference for each grid point, which is output from the acceptable color difference determination unit 91, and determines new CMYK signal values corresponding to each grid point.

The LUT creation unit 23 and the RGB image data acquisition unit 24 are the same as those of the first embodiment, and therefore, explanation thereof is omitted.

The color conversion unit 25 creates CMYK image data by using the updated LUT that is created by the LUT creation unit 23 and outputs the created CMYK image data to the image forming unit 16. Further, the color conversion unit 25 calculates a toner average reduction rate indicating about how much toner can be reduced compared to the case where the original LUT is used by using the updated LUT, and outputs the calculated toner average reduction rate on the selection panel 1001.

By the present embodiment, it is possible for a user to select a setting that enables to obtain desired printing results in the case of causing both the maintenance of a hue and the reduction in toner consumption to coexist. Further, by the present embodiment, it is also made possible to visualize and display the reduction effect of the toner consumption.

Fourth Embodiment

In the first embodiment to the third embodiment, by finding a combination of CMYK values, which minimizes the sum of each value of CMYK, within the range of acceptable color difference for each grid point, and so on, color conversion that reduces toner consumption while maintaining the hue of an image is performed. However, in the first embodiment to the third embodiment, the distance between the grid point of interest and a peripheral grid point of the grid point of interest (hereinafter, inter-grid point distance) is not taken into consideration. Because of this, there is such a problem that it is not possible to distinguish difference between the color corresponding to the grid point of interest and the color corresponding to the peripheral grid point of the grid pint of interest at part of the grid points because the inter-grid point distance after the conversion is too small, and therefore, gradation cannot be maintained. Consequently, in the present embodiment, gradation is controlled for each grid point based on a color distinguishable color difference indicating the magnitude of the minimum color difference by which the color difference can be distinguished. In detail, based on the acceptable color difference and the color distinguishable color difference for each grid point, a combination of CMYK values, which minimizes the sum of each value of CMYK, is found while controlling the hue and gradation and color conversion is performed. In the following, differences from the above-described embodiments are explained mainly and explanation of the same configuration and processing as those of the above-described embodiments is omitted appropriately. The image forming apparatus 1 in the present embodiment has a configuration similar to that of the first embodiment.

<About Image Processing Unit>

Figure 14:
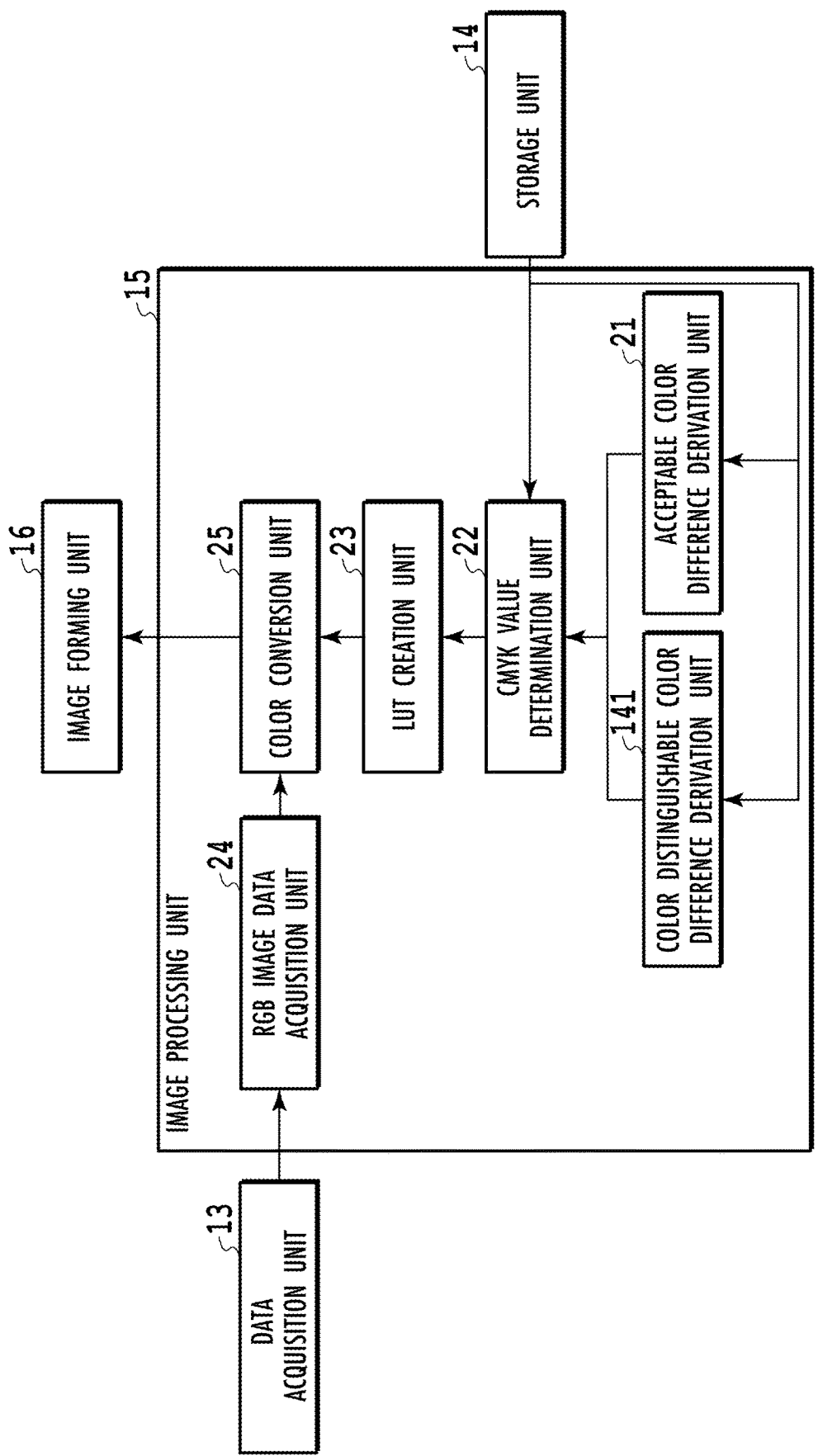
FIG. 14 is a diagram for explaining the image processing unit 15 in a fourth embodiment.

In the following, the image processing unit 15 in the present embodiment is explained by using FIG. 14. As shown schematically, the image processing unit 15 has a configuration similar to that of the first embodiment, but differs from that of the first embodiment in further having a color distinguishable color difference derivation unit 141 (see FIG. 2).

The color distinguishable color difference derivation unit 141 acquires the L*a*b* values corresponding to the important color from the storage unit 14 and the color distinguishable color difference corresponding to the important color. Then, the color distinguishable color difference derivation unit 141 calculates the color distinguishable color difference corresponding to each grid point in the RGB space based on these acquired values and creates a table that holds the color distinguishable color difference corresponding to each grid point in the RGB space. In Table 10, an example of this table is shown. In Table 10, the color distinguishable color difference corresponding to the jth grid point is represented as $\Delta E_{grid\ point\ j}$. Details of the color distinguishable color difference derivation unit will be described later by using FIG. 15 and FIG. 16.

TABLE 10

| Grid point | Color distinguishable color difference |
|---|---|
| grid point 1 | $\Delta E_{grid\ point\ 1}$ |
| grid point 2 | $\Delta E_{grid\ point\ 2}$ |
| . . . | . . . |
| grid point P | $\Delta E_{grid\ point\ P}$ |

The CMYK value determination unit 22 in the present embodiment acquires the table that holds the acceptable color difference for each grid point, which is output from the acceptable color difference derivation unit 21, and the table that holds the color distinguishable color difference for each grid point, which is output from the color distinguishable color difference derivation unit 141. Next, the CMYK value determination unit 22 determines new CMYK values corresponding to each grid point by using these acquired tables. Details of the processing to determine new CMYK values, which is performed by the CMYK value determination unit 22 in the present embodiment, will be described later by using FIG. 18.

<About Color Distinguishable Color Difference Derivation Unit>

In the following, the color distinguishable color difference derivation unit 141 is explained. The color distinguishable color difference derivation unit 141 in the present embodiment creates a table that holds the color distinguishable color difference corresponding to the grid point by two steps below, which are obtained by roughly dividing the procedure into two.

First step: create a regression model capable of calculating the color distinguishable color difference across the entire color area (hereinafter, color distinguishable color difference regression model).

Second step: create a table that holds the color distinguishable color difference corresponding to each grid point by calculating the color distinguishable color difference corresponding to each grid point by using the color distinguishable color difference regression model created at First step.

Figure 15:
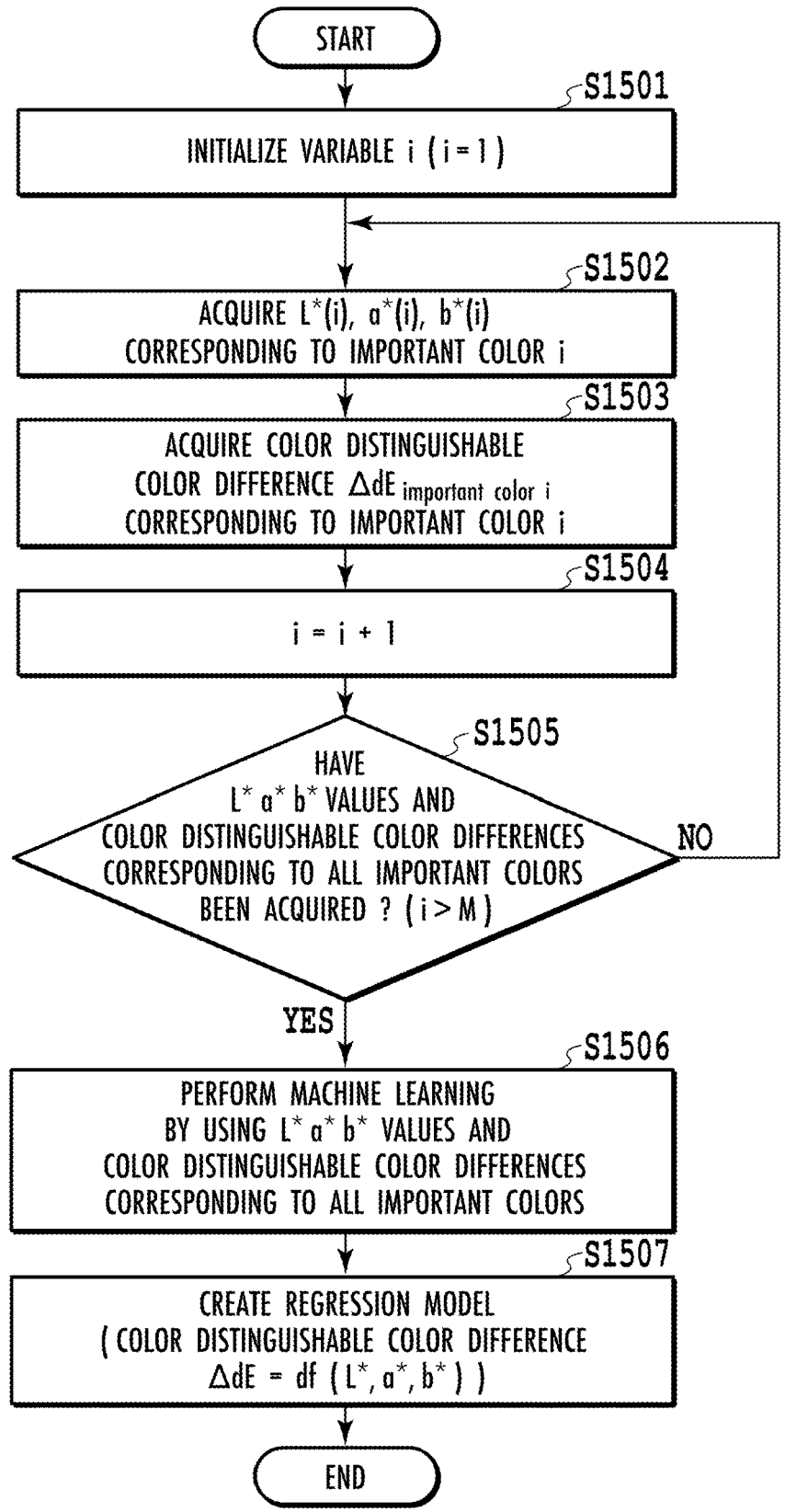
FIG. 15 is a flowchart of processing to create a color distinguishable color difference regression model in the fourth embodiment.

First, the color distinguishable color difference regression model (First step) is explained by using FIG. 15. FIG. 15 is a detailed flowchart of First step (creation of the color distinguishable color difference regression model).

Step S1501 is the same as step S301 in FIG. 3 and step S1502 is the same as step S302 in FIG. 3.

At step S1503, the color distinguishable color difference derivation unit 141 acquires the color distinguishable color difference corresponding to the important color i by using the table (Table 11) that holds the color distinguishable color difference corresponding to the important color, which is stored in the storage unit 14.

TABLE 11

| Important color | Color distinguishable color difference |
|---|---|
| important color 1 | color distinguishable color difference $\Delta E_{important\ color\ 1}$ |
| important color 2 | color distinguishable color difference $\Delta E_{important\ color\ 2}$ |
| . . . | . . . |
| important color M | color distinguishable color difference $\Delta E_{important\ color\ M}$ |

Step S1504 is the same as step S304 in FIG. 3.

At step S1505, the color distinguishable color difference derivation unit 141 determines whether each value of L*, a*, and b* and the color distinguishable color differences corresponding to all the important colors have been acquired (whether i>M is satisfied). In the case where the results of the determination at step S1505 are affirmative, the processing advances to step S1506. On the other hand, in the case where the results of the determination are negative, the processing returns to step S1502.

At step S1506, the color distinguishable color difference derivation unit 141 performs machine learning by using each value of L*, a*, and b* and the color distinguishable color differences corresponding to all the important colors.

At step S1507, the color distinguishable color difference derivation unit 141 creates a color distinguishable color difference regression model by using the results at step S1506. The color distinguishable color difference regression model that is created at this step is a function df as expressed by expression (6), which calculates the color distinguishable color difference ΔdE by taking each value of L*, a*, and b* as an input value.

$$\Delta dE = df(L^*, a^*, b^*) \quad \text{expression (6)}$$

By the above processing, the color distinguishable color difference derivation unit 141 creates the color distinguishable color difference regression model (function df). Due to this, it is made possible to input each value of L*, a*, and b* of an arbitrary color to the color distinguishable color difference regression model and to calculate the color distinguishable color difference dE corresponding thereto, and therefore, it is made possible to calculate the color distinguishable color difference corresponding to each grid point.

Figure 16:
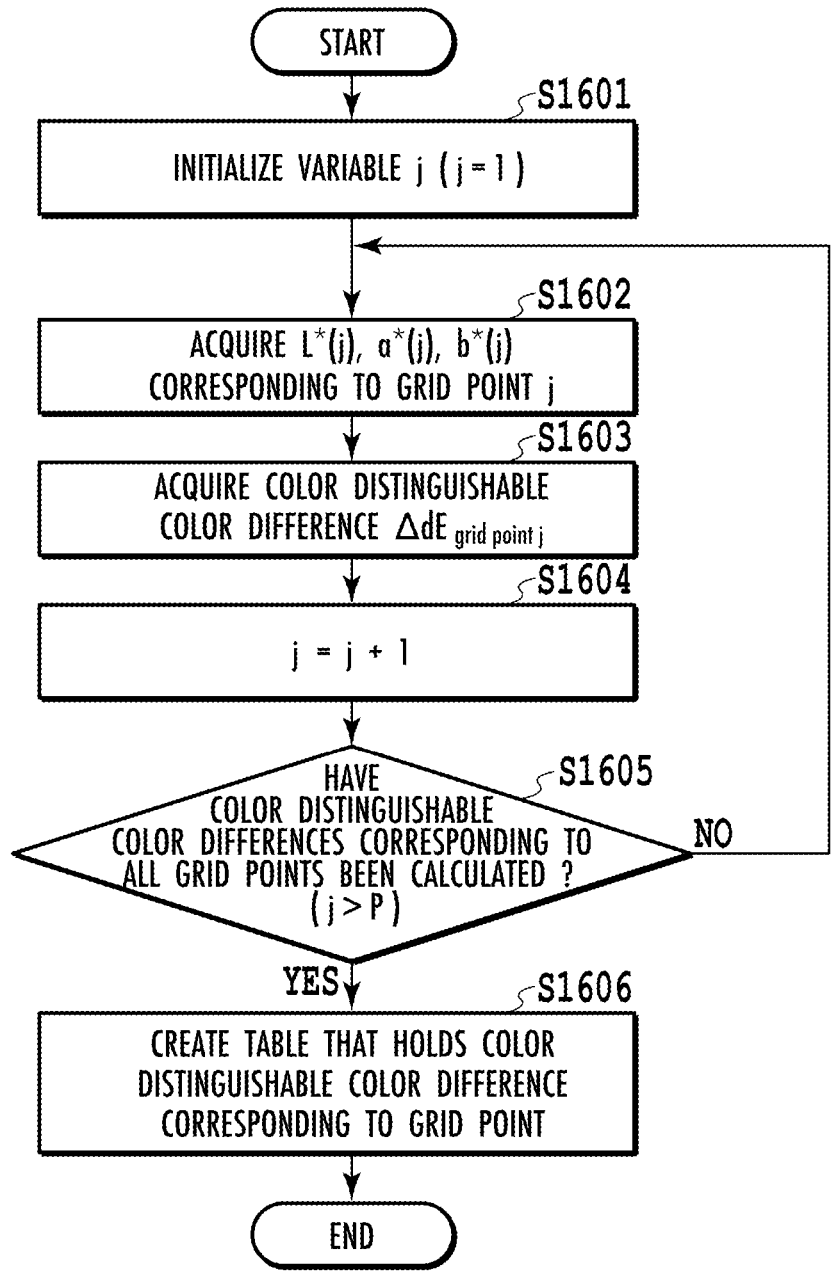
FIG. 16 is a flowchart of processing to create a table that holds a color distinguishable color difference corresponding to a grid point in the fourth embodiment.

Next, the creation of the table that holds the color distinguishable color difference corresponding to each grid point (Second step) is explained by using FIG. 16. FIG. 16 is a detailed flowchart of Second step (creation of the table that holds the color distinguishable color difference corresponding to each grid point).

Step S1601 is the same as step S401 in FIG. 4 and step S1602 is the same as step S402 in FIG. 4.

At step S1603, the color distinguishable color difference derivation unit 141 inputs each value of L* (j), a* (j), and b* (j) acquired at step S1602 to the color distinguishable color difference regression model df and calculates the color distinguishable color difference $\Delta dE_{grid}$ point j corresponding to the grid point j.

Step S1604 is the same as step S404 in FIG. 4.

At step S1605, the color distinguishable color difference derivation unit 141 determines whether the color distinguishable color differences corresponding to all the grid points have been calculated (whether j>P is satisfied). In the case where the results of the determination at step S1605 are affirmative, the processing advances to step S1606. On the other hand, in the case where the results of the determination are negative, the processing returns to step S1602.

At step S1606, the color distinguishable color difference derivation unit 141 creates a table that holds the color distinguishable color difference corresponding to each grid point shown in Table 10 by using the color distinguishable color difference calculated at step S1603 and outputs the table to the CMYK value determination unit 22. The above is the processing that is performed by the color distinguishable color difference derivation unit 141.

<About Acceptable Color Difference and Color Distinguishable Color Difference>

Figure 17:
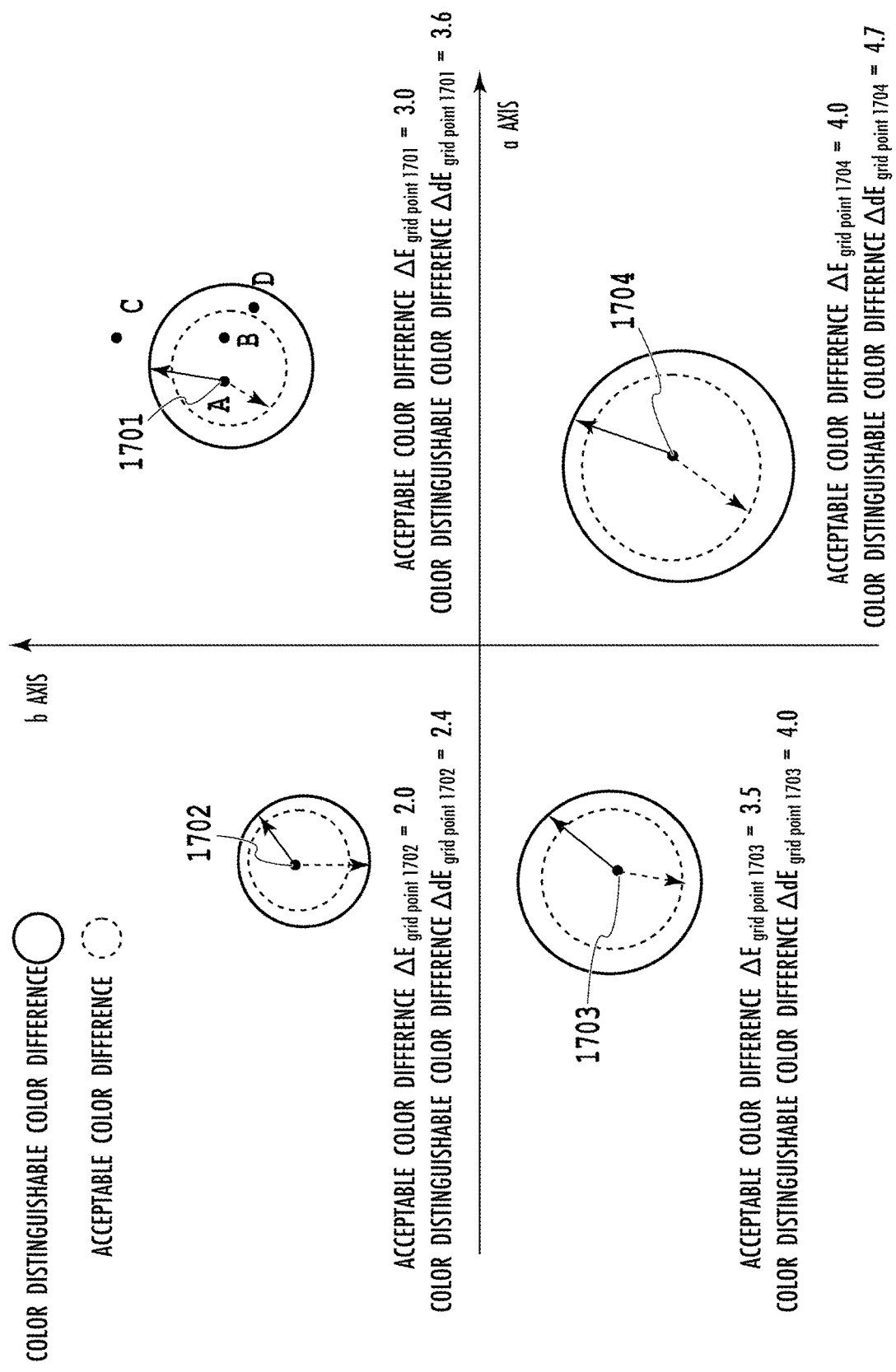
FIG. 17 is a diagram for explaining a relationship between an acceptable color difference and a color distinguishable color difference, which correspond to each grid point, and a color distinguishable color difference that differs depending on color.

FIG. 17 is a diagram explaining a relationship between the acceptable color difference and the color distinguishable color difference, which correspond to each grid point, and the fact that the color distinguishable color differences calculated at step S1603 are different for different colors.

First, the relationship between the acceptable color difference and the color distinguishable color difference, which correspond to each grid point, is explained. As an example, referring to FIG. 17, the acceptable color difference corresponding to color A (grid point 1701) is 3 and the color distinguishable color difference corresponding thereto is 3.6. Here, in the case where attention is focused on color B, the color difference between color B and color A is smaller than the acceptable color difference of color A, and therefore, color B and color A seem to be the same color. In the case where attention is focused on color C, the color difference between color C and color A is larger than the color distinguishable color difference of color A, and therefore, it is possible to distinguish color C from color A. In the case where attention is focused on color D, the color difference between color D and color A is larger than the acceptable color difference of color A, and therefore, color D and color A do not seem to be the same color, and the color difference between color D and color A is smaller than the color distinguishable color difference of color A, and therefore, it is not possible to distinguish color D from color A.

Next, the fact that the color distinguishable color differences are different for different colors is explained. The color distinguishable color difference is determined by the feature of color as the acceptable color difference, and therefore, the color distinguishable color difference corresponding to each grid point is different from one another. As an example, referring to FIG. 17, the color distinguishable color difference corresponding to the grid point 1701 is 3.6. The color distinguishable color difference corresponding to a grid point 1702 is 2.4. The color distinguishable color difference corresponding to a grid point 1703 is 4.0. The color distinguishable color difference corresponding to a grid point 1704 is 4.7. As described above, the color distinguishable color differences different for different grind points are calculated.

<About CMYK Value Determination Unit>

Figure 18:
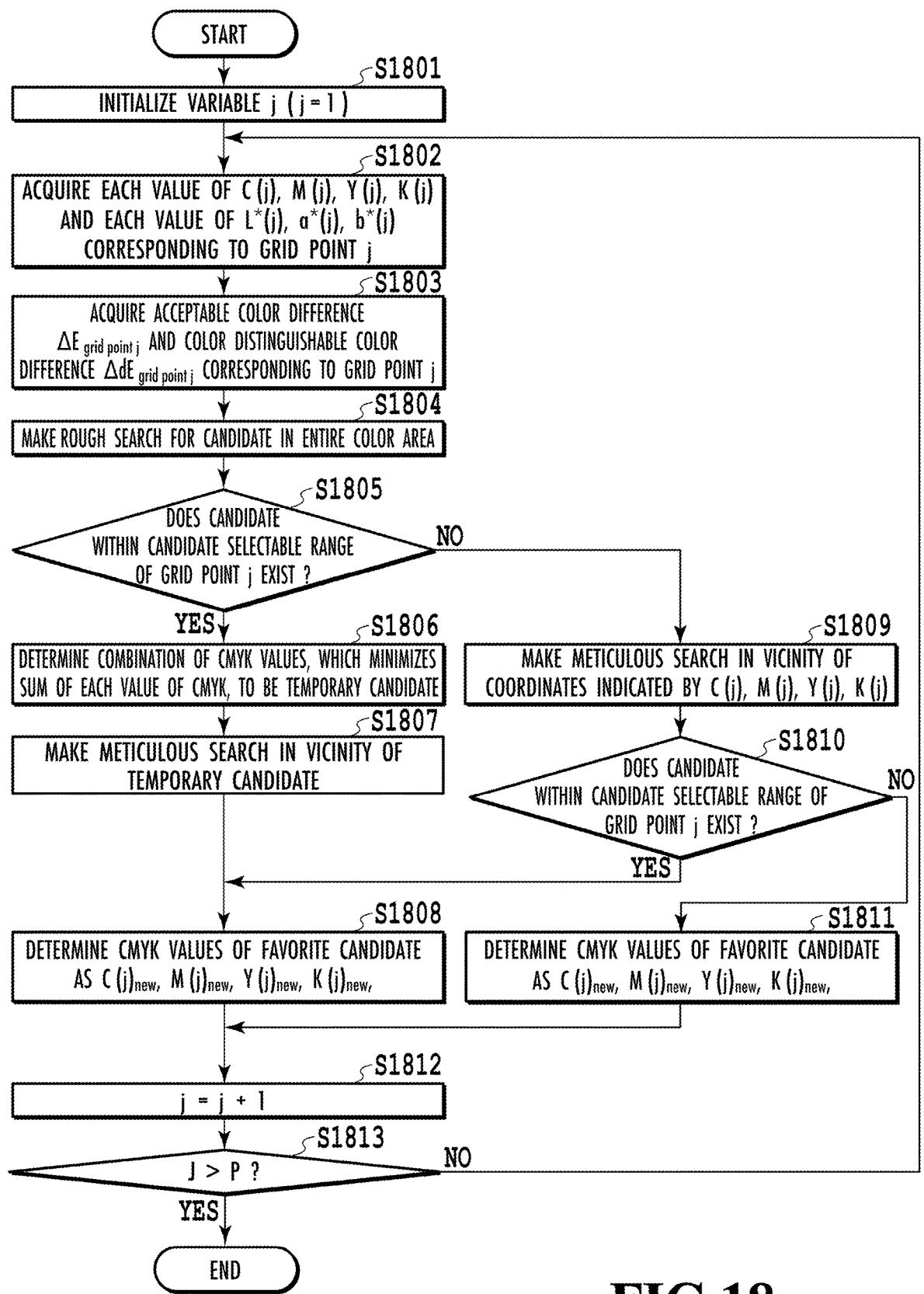
FIG. 18 is a flowchart of processing that is performed by the CMYK value determination unit 22 in the fourth embodiment.

In the following, the CMYK value determination unit 22 in the present embodiment is explained. FIG. 18 is a flowchart of processing that is performed by the CMYK value determination unit 22 in the present embodiment. In the following, differences from the CMYK value determination unit 22 of the first embodiment are explained mainly and explanation of the same processing as that of the first embodiment is omitted appropriately.

Step S1801 is the same as step S601 in FIG. 6 and step S1802 is the same as step S602 in FIG. 6.

At step S1803, the CMYK value determination unit 22 acquires the acceptable color difference $\Delta E_{grid\ point\ j}$ by using the table created by the acceptable color difference derivation unit 21 and acquires the color distinguishable color difference $\Delta dE_{grid\ point\ j}$ by using the table created by the color distinguishable color difference derivation unit 141.

At step S1804, the same processing as that at step S604 in FIG. 6 is performed, but the search range corresponding to the grid point j is different from the search range of the first embodiment. Specifically, in the first embodiment, a rough search is made for the CMYK values within the range of acceptable color difference corresponding to the grid point j, but in the present embodiment, a rough search is made for the CMYK values within a candidate selectable range corresponding to the grid point j. Details of the candidate selectable range will be described later by using FIG. 19 and FIG. 20.

At step S1805, the CMYK value determination unit 22 determines whether a candidate within the candidate selectable range corresponding to the grid point j exists. In the case where the results of the determination at step S1805 are affirmative, the processing advances to step S1806. On the other hand, in the case where the results of the determination are negative, the processing advances to step S1809.

At step S1806, the CMYK value determination unit 22 determines a combination of CMYK values, which minimizes the sum of each value of CMYK, among the candidates within the candidate selectable range corresponding to the grid point j to be a temporary candidate.

At step S1807, the same processing as that at step S607 in FIG. 6 is performed, but the search range corresponding to the grid point j is different from the search range of the first embodiment. Specifically, in the first embodiment, a meticulous search is made within the range W expressed by expression (3), but in the present embodiment, a meticulous search is made within the range W expressed by expression (3) and within the candidate selectable range corresponding to the grid point j.

At step S1808, the CMYK value determination unit 22 determines a combination of CMYK values, which minimizes the sum of each value of CMYK, among the candidates within the range W expressed by expression (3) and within the candidate selectable range corresponding to the grid point j to be new CMYK values corresponding to the grid point j. Each of the CMYK values that are newly determined is taken to be C $(j)_{new}$, M $(j)_{new}$, Y $(j)_{new}$, and K $(j)_{new}$, respectively.

At step S1809, the CMYK value determination unit 22 makes a meticulous search in the vicinity of the coordinates indicated by each value of C (j), M (j), Y (j), and K (j) in the CMYK color space. The range in which a search is made at this step is set to a range within the range W expressed by expression (3) and within the candidate selectable range corresponding to the grid point j as at step S1807.

At step S1810, the CMYK value determination unit 22 determines whether a candidate within the candidate selectable range corresponding to the grid point j exists. In the case where the results of the determination at step S1810 are affirmative, the processing advances to step S1808. On the other hand, in the case where the results of the determination are negative, the processing advances to step S1811.

Steps S1811 to S1813 are the same as steps S611 to S613 in FIG. 6.

By the above processing, the CMYK value determination unit 22 derives new CMYK values, that is, $C_{new}$, $M_{new}$, $Y_{new}$, and $K_{new}$ for all the grid points.

<About Candidate Selectable Range Corresponding to Each Grid Point>

In the following, the candidate selectable range corresponding to each grid point is explained by using FIG. 19 and FIG. 20.

Figure 19:
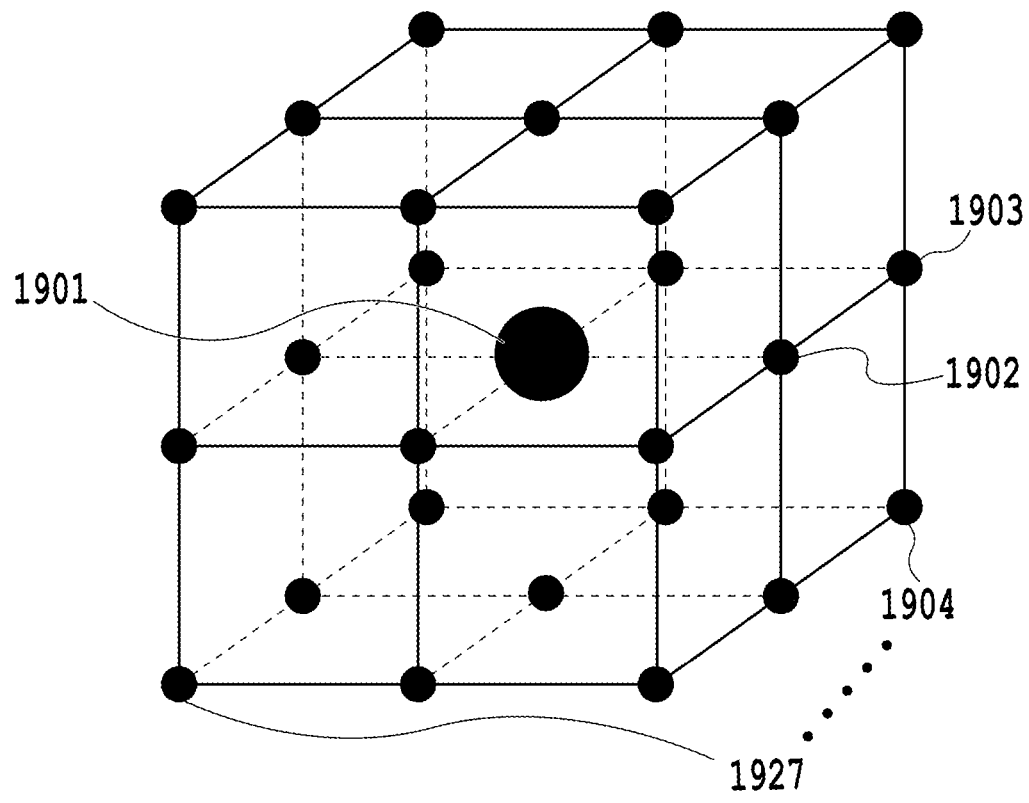
FIG. 19 is an image diagram of a grid point of interest and (twenty-six) peripheral grid points thereof in the fourth embodiment.
Figure 19:
Figure 19:

First, the relationship between the grid point of interest and peripheral grid points thereof is explained by using FIG. 19. FIG. 19 an image diagram of the grid point of interest and twenty-six grid points existing on the periphery of the grid point of interest in the RGB space represented by three-dimensional coordinate axes (R axis, G axis, B axis). As shown schematically, in the simple cubic lattice structure, on the periphery of a grid point of interest 1901, a grid point 1902 to a grid point 1927 exist. The twenty-six grid points existing on the periphery of the grid point of interest are called peripheral grid points.

Figure 20:
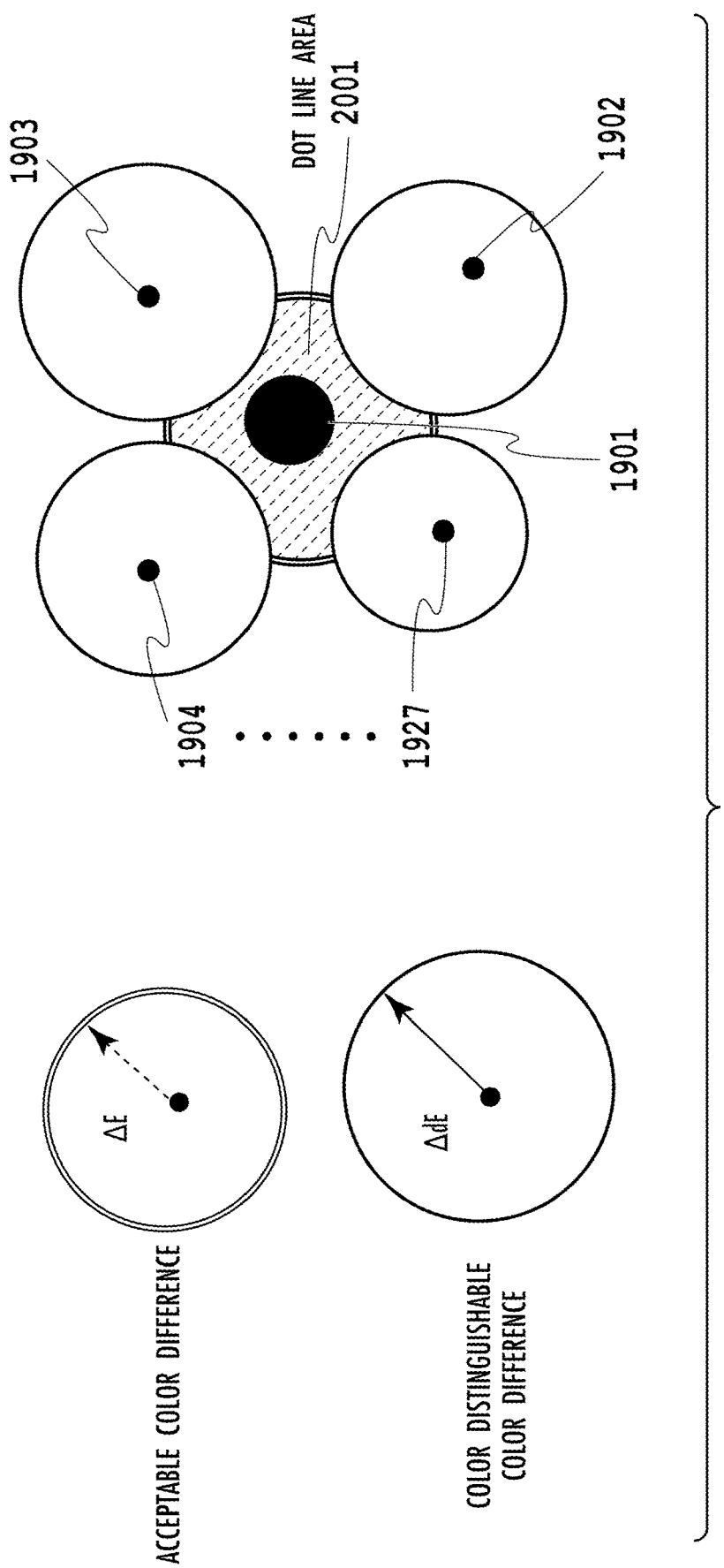
FIG. 20 is a diagram for explaining a candidate selectable range corresponding to a grid point of interest in the fourth embodiment.

Next, the candidate selectable range corresponding to the grid point of interest is explained by using FIG. 20. FIG. 20 is an image diagram of the candidate selectable range corresponding to the grid point of interest 1901 shown in FIG. 19.

A circle indicate by a double line in FIG. 20 (hereinafter, called a double-line circle) is a circle whose center is located at the coordinates indicated by each value of L*, a*, and b* corresponding to the grid point of interest (in the present embodiment, the grid point 1901) and whose radius is the acceptable color difference ΔE corresponding to the grid point of interest. All the colors within this double-line circle seem to be the same as the color corresponding to the grid point 1901.

On the other hand, a circle indicated by the solid line (hereinafter, called a solid line circle) is a circle whose center is located at the coordinates indicated by each value of L*, a*, and b* corresponding the peripheral grid point (in the present embodiment, one of the grid point 1902 to the grid point 1927) and whose radius is the color distinguishable color difference ΔdE corresponding to each peripheral grid point. In the case where attention is focused on arbitrary one of these solid line circles, all the colors outside the solid line circles on which attention is focused are distinguishable from the color corresponding to the peripheral grid point, which is the center of the solid line circle.

The candidate selectable range corresponding to the grid point of interest in the present embodiment is a range in which the color difference from the grid point of interest is smaller than or equal to the acceptable color difference for the grid point of interest and in which the color difference from the peripheral grid point of the grid point of interest is larger than or equal to the color distinguishable color difference for the peripheral grid point. Consequently, in the example shown in FIG. 20, the candidate selectable range corresponding to the grid point of interest 1901 is within the double-line circle whose center is the grid point of interest 1901 and outside the solid line circles whose centers are the peripheral grid points of the grid point of interest 1901, that is, the grid point 1902 to the grid point 1927, respectively. A dot line area in FIG. 20 indicates the candidate selectable range corresponding to the grid point of interest 1901.

For the candidate selectable range corresponding to an arbitrary grid point of interest, all the colors within the candidate selectable range seem to be the same as the color corresponding to the grid point of interest, and therefore, even in the case where one of all the colors is used in place of the color corresponding to the grid point of interest, it is possible to maintain the hue of the color corresponding to the grid point of interest. On the other hand, all the colors within the candidate selectable range can be distinguished from the color corresponding to the peripheral grid point of the grid point of interest, and therefore, even in the case where one of all the colors is used in place of the color corresponding to the grid point of interest, it is possible to maintain gradation.

The LUT creation unit 23, the RGB image data acquisition unit 24, and the color conversion unit 25 are the same as those of the first embodiment, and therefore, explanation thereof is omitted.

In the present embodiment, by using the updated LUT for the toner-saving mode, which is created by the LUT creation unit 23, RGB image data is converted into CMYK image data. Due to this, it is made possible to reduce toner consumption to the maximum while maintaining the hue and gradation of an image at the time of producing an output in the toner-saving mode.

The case is explained where the RGB color space is used as a color space and toner of each of CMYK is used as a color material, but it is also possible to apply the present embodiment to the case where another color space and another color material are used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is made possible to reduce consumption of a color material, such as toner, to the maximum while maintaining the hue of an image before and after color conversion to reduce the consumption.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-199177 filed Oct. 7, 2016, and No. 2017-042890 filed Mar. 7, 2017, which are hereby incorporated by reference wherein in their entirety.

What is claimed is:

1. A lookup table creation apparatus for obtaining an original lookup table that converts pixel values at each grid point of a first color space into original pixel values of a second color space corresponding to color materials to be used for printing, the apparatus comprising:
   at least one processor which acts as:
   a derivation unit configured to derive an acceptable color difference at each said grid point of the first color space indicating a range of acceptable color difference from the original pixel values of the second color space, wherein a derived acceptable color difference for one of the grid points of the first color space is different from those for others of the grid points of the first color space;
   a determination unit configured to determine new pixel values of the second color space corresponding to the color materials at each said grid point of the first color space, based on the derived acceptable color difference, so that a sum of the determined new pixel values of the second color space at each said grid point of the first color space is equal to or less than a sum of the original pixel values of the second color space at each said grid point of the first color space, and the color difference between the new pixel values of the second color space and the original pixel values of the second color space is equal to or less than the derived acceptable color difference; and
   a lookup table creation unit configured to create a second lookup table that converts pixel values of the first color space into the determined new pixel values of the second color space corresponding to the color materials.

2. The image processing apparatus according to claim 1, wherein
   the acceptable color difference is derived in accordance with a feature of color and an acceptable color difference corresponding to a grid point in the color space is different from one another.

3. The image processing apparatus according to claim 1, wherein
   in deriving the acceptable color difference, a regression model is created, wherein the regression model is capable of deriving an acceptable color difference corresponding to each grid point in the color space by performing machine learning using an important color and an acceptable color difference corresponding to the important color.

4. The image processing apparatus according to claim 1, wherein
   in determining new pixel values of the second color space, there is a determination of whether a candidate of a combination of a pixel value of each color material, which corresponds to each of the grid points, exists within a range of the derived acceptable color difference and determines, in a case where the candidate exists, a combination that minimizes the sum of a pixel value of each of the color materials among the candidates to be pixel values of color materials, which corresponds to each of the grid points, and, in a case where the candidate does not exist, the pixel values of color materials in the first lookup table are determined to be pixel values of color materials, which corresponds to each of the grid points.

5. The image processing apparatus according to claim 1, wherein
   the acceptable color difference is derived in accordance with user information, which corresponds to each of the grid points.

6. The image processing apparatus according to claim 5, wherein the at least one processor further acts as:
   an information acquisition unit configured to acquire the user information; and
   a determination unit configured to determine an acceptable color difference corresponding to each of the grid points based on the acquired user information, wherein
   the new pixel values of the second color space are determined based the determined acceptable color difference.

7. The image processing apparatus according to claim 5, wherein
   the user information is occupational information indicating an occupation of the user or information indicating preferences of the user.

8. The image processing apparatus according to claim 1, wherein
   the acceptable color difference is derived in accordance with an acceptable color difference level, which corresponds to each of the grid points.

9. The image processing apparatus according to claim 8, wherein the at least one processor further acts as:
   an information acquisition unit configured to acquire user setting information including the acceptable color difference level, which is input by a user; and
   a determination unit configured to determine an acceptable color difference corresponding to each of the grid points based on the acquired user setting information, wherein the new pixel values of the second color space are determined based on the determined acceptable color difference.

10. The image processing apparatus according to claim 9, wherein the at least one processor further acts as:
a selection panel on which for the user to input the user setting information.

11. A lookup table creation apparatus for obtaining an original lookup table that converts pixel values at each grid point of a first color space into original pixel values of a second color space corresponding to color materials to be used for printing, the apparatus comprising:
at least one processor which acts as:
a first derivation unit configured to derive an acceptable color difference at each said grid point of the first color space indicating a range of acceptable color difference from the original pixel values of the second color space, wherein a derived acceptable color difference for one of the grid points of the first color space is different from those for others of the grid points of the first color space;
a second derivation unit configured to derive a distinguishable color difference indicating a minimum color difference that enables a distinction between two different colors, which corresponds to each grid point in the color space;
a determination unit configured to determine new pixel values of the second color space corresponding to the color materials at each said grid point of the first color space, based on the derived acceptable color difference and based on the derived distinguishable color difference, so that a sum of the determined new pixel values of the second color space at each said grid point of the first color space is equal to or less than a sum of the original pixel values of the second color space at each said grid point of the first color space, and the color difference between the new pixel values of the second color space and the original pixel values of the second color space is equal to or less than the derived acceptable color difference and is equal to or less than the derived distinguishable color difference; and
a lookup table creation unit configured to create a second lookup table that converts pixel values of the first color space into the determined new pixel values of the second color space corresponding to the color materials.

12. The image processing apparatus according to claim 11, wherein
the acceptable color difference is derived in accordance with a feature of color and an acceptable color difference corresponding to a grid point in the color space is different from one another.

13. The image processing apparatus according to claim 11, wherein
the distinguishable color is derived in accordance with a feature of color and a color distinguishable color difference corresponding to a grid point in the color space is different from one another.

14. The image processing apparatus according to claim 11, wherein
in deriving the acceptable color difference, a regression model is created, wherein the regression model is capable of deriving an acceptable color difference corresponding to each grid point in the color space by performing machine learning using an important color and an acceptable color difference corresponding to the important color.

15. The image processing apparatus according to claim 11, wherein
in deriving the distinguishable color difference, a regression model is created, wherein the regression model is capable of deriving a distinguishable color difference corresponding to each grid point in the color space by performing machine learning using an important color and a distinguishable color difference corresponding to the important color.

16. The image processing apparatus according to claim 11, wherein
the determination unit:
determines a candidate selectable range by using the derived acceptable color difference and the derived distinguishable color difference;
determines whether a candidate of a combination of a pixel value of each color material, which corresponds to each of the grid points, exists within the candidate selectable range corresponding to each of the grid points;
determines, in a case where the candidate exists, a combination that minimizes the sum of a pixel value of each of the color materials among the candidates to be pixel values of color materials, which corresponds to each of the grid points; and
determines, in a case where the candidate does not exist, the pixel values of color materials in the first lookup table to be pixel values of color materials, which corresponds to each of the grid pints.

17. The image processing apparatus according to claim 1, wherein
in a normal mode in which printing is performed without saving the color materials, color conversion using the first lookup table is performed and in a saving mode in which printing is performed by saving the color materials, color conversion using the second lookup table is performed.

18. The image processing apparatus according to claim 1, wherein
the color space is an RGB color space and the color materials are toner of cyan, magenta, yellow, and black.

19. A lookup table creation method for obtaining an original lookup table that converts pixel values at each grid point of a first color space into original pixel values of a second color space corresponding to color materials to be used for printing, the method comprising:
a step of deriving an acceptable color difference at each said grid point of the first color space indicating a range of acceptable color difference from the original pixel values of the second color space, wherein a derived acceptable color difference for one of the grid points of the first color space is different from those for others of the grid points of the first color space;
a step of determining new pixel values of the second color space corresponding to the color materials at each said grid point of the first color space, based on the derived acceptable color difference, so that a sum of the determined new pixel values of the second color space at each said grid point of the first color space is equal to or less than a sum of the original pixel values of the second color space at each said grid point of the first color space, and the color difference between the new pixel values of the second color space and the original pixel values of the second color space is equal to or less than the derived acceptable color difference; and a step of creating a second lookup table that converts pixel values of the first color space into the determined new pixel values of the second color space corresponding to the color materials.

20. A non-transitory computer readable storage medium storing a program for causing a computer to perform each step in a lookup table creation method for obtaining an original lookup table that converts pixel values at each grid point of a first color space into original pixel values of a second color space corresponding to color materials to be used for printing, the method comprising:

a step of deriving an acceptable color difference at each said grid point of the first color space indicating a range of acceptable color difference from the original pixel values of the second color space, wherein a derived acceptable color difference for one of the grid points of the first color space is different from those for others of the grid points of the first color space;

a step of determining new pixel values of the second color space corresponding to the color materials at each said grid point of the first color space, based on the derived acceptable color difference, so that a sum of the determined new pixel values of the second color space at each said grid point of the first color space is equal to or less than a sum of the original pixel values of the second color space at each said grid point of the first color space, and the color difference between the new pixel values of the second color space and the original pixel values of the second color space is equal to or less than the derived acceptable color difference; and a step of creating a second lookup table that converts pixel values of the first color space into the determined new pixel values of the second color space corresponding to the color materials.

21. The image processing apparatus according to claim 1, wherein the first lookup table is defined by multiple grid points of which each corresponds to a pixel value in the color space and stores a corresponding pixel value of color materials; and wherein the second lookup table is defined by multiple grid points of which each corresponds to a pixel value in the color space and stores a corresponding pixel value of color materials different from the pixel value of color materials stored by the first lookup table.

22. The image processing apparatus according to claim 1, wherein the acceptable color difference is derived based on hue of each grid point.

\* \* \* \* \*